US011816800B2

(12) United States Patent
Oser et al.

(10) Patent No.: US 11,816,800 B2
(45) Date of Patent: Nov. 14, 2023

(54) GUIDED CONSUMER EXPERIENCE

(71) Applicant: Apple Inc., Cupertino, CA (US)

(72) Inventors: Alexander B. Oser, Los Altos, CA (US); Jonathan S. Reiling, Cupertino, CA (US); Wai Ki Chan, Mountain View, CA (US); Paul C. Hikiji, San Jose, CA (US); Wilson W. Yin, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/904,995

(22) Filed: Jun. 18, 2020

(65) Prior Publication Data

US 2021/0005022 A1 Jan. 7, 2021

Related U.S. Application Data

(60) Provisional application No. 62/870,396, filed on Jul. 3, 2019.

(51) Int. Cl.
*G06T 19/00* (2011.01)
*G06Q 30/00* (2012.01)
*G06V 20/10* (2022.01)
*G06Q 30/016* (2023.01)

(52) U.S. Cl.
CPC ......... *G06T 19/006* (2013.01); *G06Q 30/016* (2013.01); *G06V 20/10* (2022.01); *G06T 2200/24* (2013.01)

(58) Field of Classification Search
CPC .............. G06T 19/006; G06T 2200/24; G06K 9/00664; G06Q 30/016; G06Q 30/0601; G06Q 30/0281; G06Q 30/0613; G06Q 30/0643
See application file for complete search history.

(56) References Cited

U.S. PATENT DOCUMENTS

| | | | | |
|---|---|---|---|---|
| 8,606,642 | B2* | 12/2013 | Siounis | G06Q 30/0643 705/26.1 |
| 9,679,332 | B2* | 6/2017 | Kim | G06Q 30/0254 |
| 9,734,634 | B1* | 8/2017 | Mott | G06F 3/0304 |
| 9,747,622 | B1* | 8/2017 | Johnson | G06Q 30/0601 |

(Continued)

FOREIGN PATENT DOCUMENTS

WO 2019/067476 A2 4/2019

OTHER PUBLICATIONS

Applicant-Initiated Interview Summary received for U.S. Appl. No. 16/905,032, dated Mar. 2, 2022, 4 pages.
(Continued)

*Primary Examiner* — Motilewa Good-Johnson
(74) *Attorney, Agent, or Firm* — DLA Piper LLP (US)

(57) ABSTRACT

In an exemplary process for providing a guided consumer experience, product information comprising an image of a product is displayed. A communication session with a remote user is provided. While providing the communication session, the display of product information is adjusted using information received from the communication session. A representation of the product is displayed in computer-generated reality by capturing an image using a camera, generating a view of an environment by compositing a virtual object representing the product and the captured image, and displaying the view of the environment.

28 Claims, 22 Drawing Sheets

(56) References Cited

U.S. PATENT DOCUMENTS

| | | | | |
|---|---|---|---|---|
| 9,779,444 B2* | 10/2017 | Yalniz | ............... | G06K 9/00496 |
| 9,910,927 B2* | 3/2018 | Cypher | ............. | G06Q 30/0269 |
| 9,965,793 B1* | 5/2018 | Hasan | ................... | G06F 16/951 |
| 10,002,337 B2 | 6/2018 | Siddique et al. | | |
| 10,026,629 B2* | 7/2018 | Nakamori | ......... | H01L 21/02057 |
| 10,176,471 B2* | 1/2019 | Hodges | ............. | G06Q 30/0643 |
| 10,319,150 B1* | 6/2019 | Canada | ................. | G06T 19/006 |
| 10,354,256 B1* | 7/2019 | McInerny | ............... | G06T 13/40 |
| 10,379,881 B2 | 8/2019 | Wesley et al. | | |
| 10,509,619 B2* | 12/2019 | Todeschini | ........... | G06Q 30/016 |
| 10,573,019 B1* | 2/2020 | Anadure | ................. | G06T 19/20 |
| 10,737,185 B2 | 8/2020 | Fargo | | |
| 10,755,485 B2* | 8/2020 | Mott | .................... | G06F 1/1686 |
| 10,777,009 B2* | 9/2020 | Martin | .................. | H04L 67/131 |
| 10,789,622 B2* | 9/2020 | Ayush | .................. | G06K 9/4652 |
| 10,817,066 B2 | 10/2020 | Ross et al. | | |
| 10,970,547 B2* | 4/2021 | Faulkner | ............... | G06T 19/006 |
| 10,990,246 B1* | 4/2021 | Law | ..................... | G06V 40/103 |
| 11,126,845 B1* | 9/2021 | Chaturvedi | ............. | G06F 3/011 |
| 11,610,247 B2* | 3/2023 | Beauchamp | ....... | G06Q 30/0631 |
| 2005/0267778 A1* | 12/2005 | Kazman | ............. | G06Q 30/0601 |
| | | | | 705/26.1 |
| 2007/0143082 A1* | 6/2007 | Degnan | ................... | G06T 11/60 |
| | | | | 703/1 |
| 2008/0071559 A1* | 3/2008 | Arrasvuori | ............ | G06T 19/006 |
| | | | | 705/26.1 |
| 2008/0263458 A1 | 10/2008 | Altberg et al. | | |
| 2009/0285483 A1* | 11/2009 | Guven | ............... | G06Q 30/0603 |
| | | | | 382/181 |
| 2009/0287534 A1* | 11/2009 | Guo | ....................... | G06Q 30/02 |
| | | | | 705/7.34 |
| 2010/0030578 A1 | 2/2010 | Siddique et al. | | |
| 2012/0086727 A1* | 4/2012 | Korah | ....................... | G06F 3/03 |
| | | | | 345/633 |
| 2012/0206449 A1* | 8/2012 | Stark | .................. | G06Q 30/0281 |
| | | | | 345/419 |
| 2013/0215116 A1 | 8/2013 | Siddique et al. | | |
| 2013/0249937 A1* | 9/2013 | Amacker | ........... | G06Q 30/0601 |
| | | | | 345/619 |
| 2014/0208272 A1* | 7/2014 | Vats | ........................ | G06F 3/011 |
| | | | | 715/852 |
| 2014/0236776 A1 | 8/2014 | Fries et al. | | |
| 2014/0333664 A1 | 11/2014 | Williams et al. | | |
| 2016/0189288 A1 | 6/2016 | Todeschini et al. | | |
| 2016/0210602 A1* | 7/2016 | Siddique | ............ | G06Q 10/0637 |
| 2017/0031503 A1 | 2/2017 | Rosenberg et al. | | |
| 2017/0053443 A1 | 2/2017 | Diament et al. | | |
| 2017/0131964 A1 | 5/2017 | Baek et al. | | |
| 2017/0132841 A1 | 5/2017 | Morrison | | |
| 2017/0236175 A1* | 8/2017 | White | ................. | H04W 40/244 |
| | | | | 705/7.32 |
| 2017/0323488 A1 | 11/2017 | Mott et al. | | |
| 2018/0059902 A1 | 3/2018 | Martin | | |
| 2018/0061128 A1 | 3/2018 | Cabanier et al. | | |
| 2018/0107269 A1* | 4/2018 | Benzies | ................ | G06F 3/0346 |
| 2018/0114372 A1 | 4/2018 | Nagy et al. | | |
| 2018/0121997 A1* | 5/2018 | O'Brien | ............ | G06Q 30/0643 |
| 2018/0124351 A1 | 5/2018 | Mattingly et al. | | |
| 2018/0157333 A1 | 6/2018 | Ross et al. | | |
| 2018/0173323 A1 | 6/2018 | Harvey et al. | | |
| 2018/0308377 A1 | 10/2018 | Pena-Rios et al. | | |
| 2018/0322702 A1* | 11/2018 | Djajadiningrat | ....... | A61B 5/332 |
| 2018/0324229 A1 | 11/2018 | Ross et al. | | |
| 2019/0065026 A1 | 2/2019 | Kiemele et al. | | |
| 2019/0068580 A1* | 2/2019 | Amid | ..................... | H04L 67/38 |
| 2019/0107990 A1 | 4/2019 | Spivack et al. | | |
| 2019/0114689 A1 | 4/2019 | Wang et al. | | |
| 2019/0146219 A1 | 5/2019 | Rodriguez | | |
| 2019/0156404 A1 | 5/2019 | Gabriele et al. | | |
| 2019/0172261 A1* | 6/2019 | Alt | ....................... | G02B 27/017 |
| 2019/0279283 A1* | 9/2019 | Benkar | ................ | H04N 9/3185 |
| 2019/0370544 A1* | 12/2019 | Wright, Jr. | ............ | G06F 3/0488 |
| 2019/0378204 A1* | 12/2019 | Ayush | ................ | G06Q 30/0643 |
| 2020/0117336 A1* | 4/2020 | Mani | ....................... | G06F 3/0304 |
| 2020/0184217 A1 | 6/2020 | Faulkner | | |
| 2020/0202634 A1* | 6/2020 | Faulkner | ................. | G06T 19/20 |
| 2020/0349614 A1* | 11/2020 | Batcha | ................. | H04L 51/046 |
| 2021/0004137 A1 | 1/2021 | Oser | | |
| 2021/0110646 A1 | 4/2021 | Dixit et al. | | |

OTHER PUBLICATIONS

Extended European Search Report received for European Patent Application No. 20183570.9, dated Sep. 1, 2020, 7 pages.

Extended European Search Report received for European Patent Application No. 20183573.3, dated Sep. 4, 2020, 7 pages.

Non-Final Office Action received for U.S. Appl. No. 16/905,032, dated Nov. 26, 2021, 25 pages.

Office Action received for European Patent Application No. 20183570.9, dated Feb. 3, 2022, 7 pages.

Final Office Action received for U.S. Appl. No. 16/905,032, dated May 18, 2022, 28 pages (28 pages of Official Copy).

Applicant-Initiated Interview Summary received for U.S. Appl. No. 16/905,032, dated Jul. 7, 2022, 5 pages.

Non-Final Office Action received for U.S. Appl. No. 16/905,032, dated Sep. 14, 2022, 27 pages.

Final Office Action received for U.S. Appl. No. 16/905,032, dated Jan. 9, 2023, 28 pages.

Applicant-Initiated Interview Summary received for U.S. Appl. No. 16/905,032, dated Feb. 23, 2023, 3 pages.

Applicant-Initiated Interview Summary received for U.S. Appl. No. 16/905,032, dated Nov. 18, 2022, 4 pages.

Office Action received for European Patent Application No. 20183573.3, dated Oct. 14, 2022, 7 pages.

Notice of Allowance received for U.S. Appl. No. 16/905,032, dated Jun. 1, 2023, 11 pages.

* cited by examiner

GUIDED CONSUMER EXPERIENCE

CROSS-REFERENCE TO RELATED APPLICATIONS

This application claims the benefit of U.S. Provisional Patent Application 62/870,396, entitled "Guided Consumer Experience," filed Jul. 3, 2019, the content of which is incorporated herein by reference in its entirety.

BACKGROUND

1. Field

The present disclosure relates generally to consumer experiences using an electronic device, and more specifically to techniques for providing an interactive, guided consumer experience with computer-generated reality capability.

2. Description of Related Art

Conventional electronic consumer experiences allow a user to browse and purchase products online with an electronic device, such as a laptop or desktop computer, tablet computer, or smartphone. A user can access product information through a website or application, select a product, and purchase the product without interaction with another human.

BRIEF SUMMARY

The present disclosure describes techniques for enhancing a consumer experience, including online retail and customer support experiences. Online shopping can lack the instantaneous feedback, answers to questions, suggestions, and human connection of an in-person shopping experience. Current online consumer applications require a user to browse through menus or perform a search function to locate a product of interest. The techniques described herein provide real-time communication with a remote salesperson (via an audio and/or video electronic communication session) who can demonstrate products on the user's device. This allows a consumer to have an interactive conversation with the salesperson, who can provide relevant products and make suggestions based on the conversation. A salesperson can cause a product to be displayed on the user's device via the electronic communication session, and the user can manipulate the product to see various portions and features. The salesperson can also manipulate the product to point out features of the product without user input. This provides a guided, remote shopping experience that allows a salesperson to lead a user through a shopping experience, from product selection to purchase, without requiring manual input by the user, but with the flexibility to allow a user to select and interact with products as desired.

Another feature described herein is the ability to incorporate interactive, computer-generated reality capabilities into the consumer experience. For example, during a communication session with a remote user (e.g., a salesperson), a consumer can activate a camera to capture an image of the consumer's environment, and then a view of an environment (e.g., a computer-generated reality (CGR) environment) is generated to show what a product would look like in the consumer's current environment. While the view of the environment is displayed on the consumer's device, the salesperson can add products to the environment, replace currently displayed products with different products, and demonstrate products and features in the computer-generated reality environment. This allows the salesperson to continue to guide the consumer through the shopping experience in computer-generated reality.

In addition to shopping, the features can also be used to enhance product support. For example, an owner of a laptop computer can initiate a communication session with a product support specialist. A virtual representation of the laptop can be displayed on the device the owner is using to communicate (e.g., a smartphone). The owner can manipulate the virtual representation to explain issues with the laptop, and the product support specialist can manipulate the virtual representation displayed on the owner's communication device to guide the owner through the troubleshooting session to address the issues.

According to some embodiments, product information comprising an image of a product is displayed, and a communication session with a salesperson of the product is provided. While providing the communication session, the display of product information is adjusted using information received from the communication session. A representation of the product is displayed by: capturing an image using a camera, generating a view of an environment by compositing a virtual object representing the product and the captured image, and displaying the view of the environment.

According to some embodiments, systems, electronic devices, or computer-readable storage media (transitory or non-transitory) provide the described techniques.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

Figure 1A:
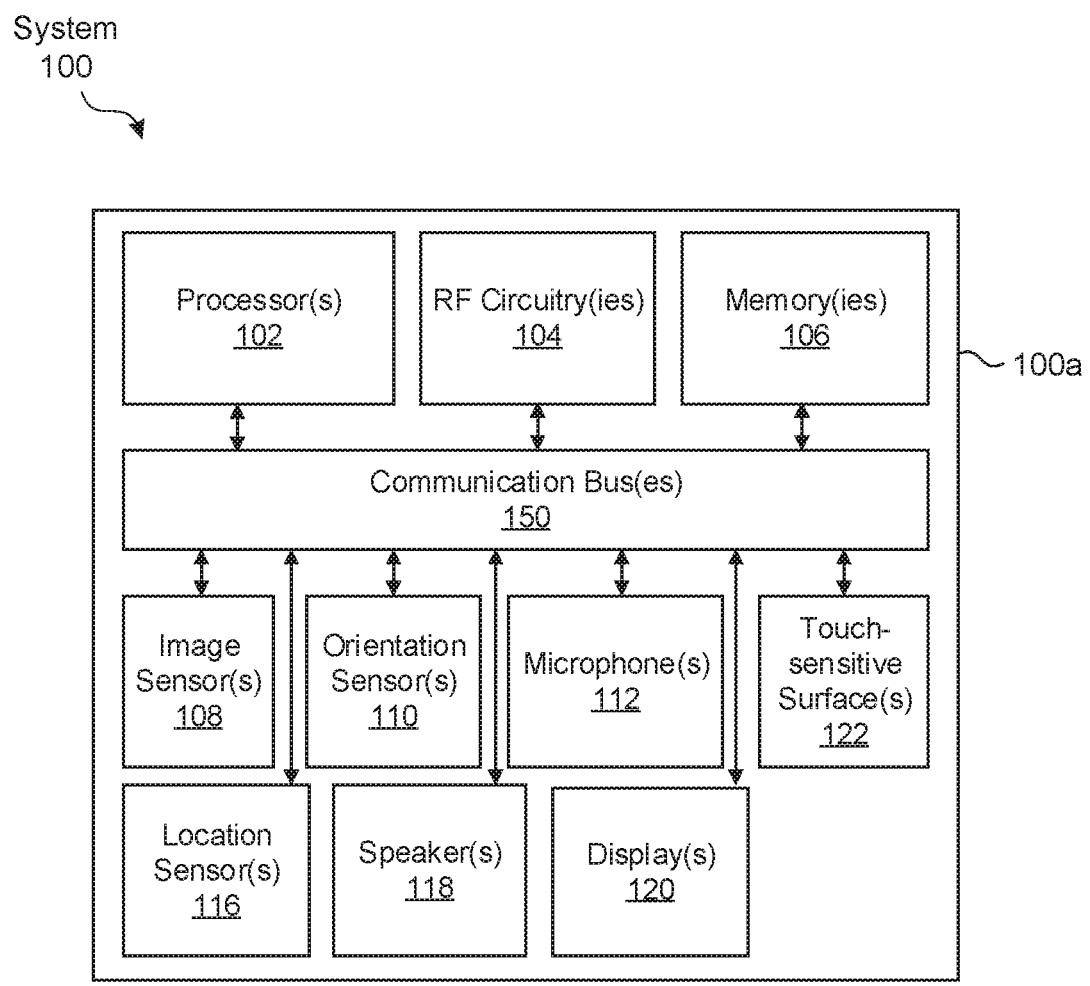
FIGS. 1A-1B depict exemplary systems for use in various computer-generated reality technologies, according to various embodiments.

The following description sets forth exemplary methods, parameters, and the like. Such description is not intended as a limitation on the scope of the present disclosure but is instead provided as a description of exemplary embodiments.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
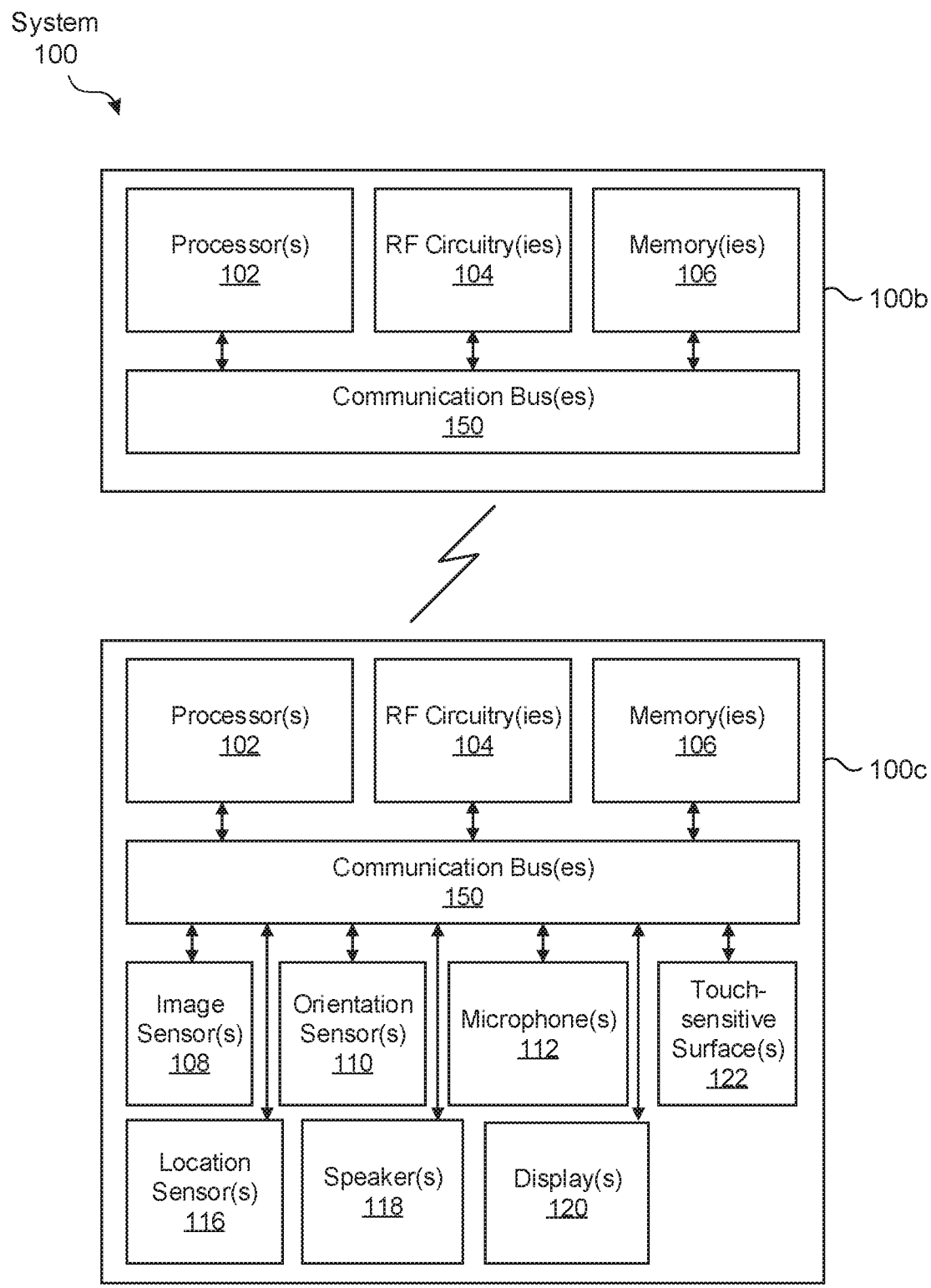

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2A:
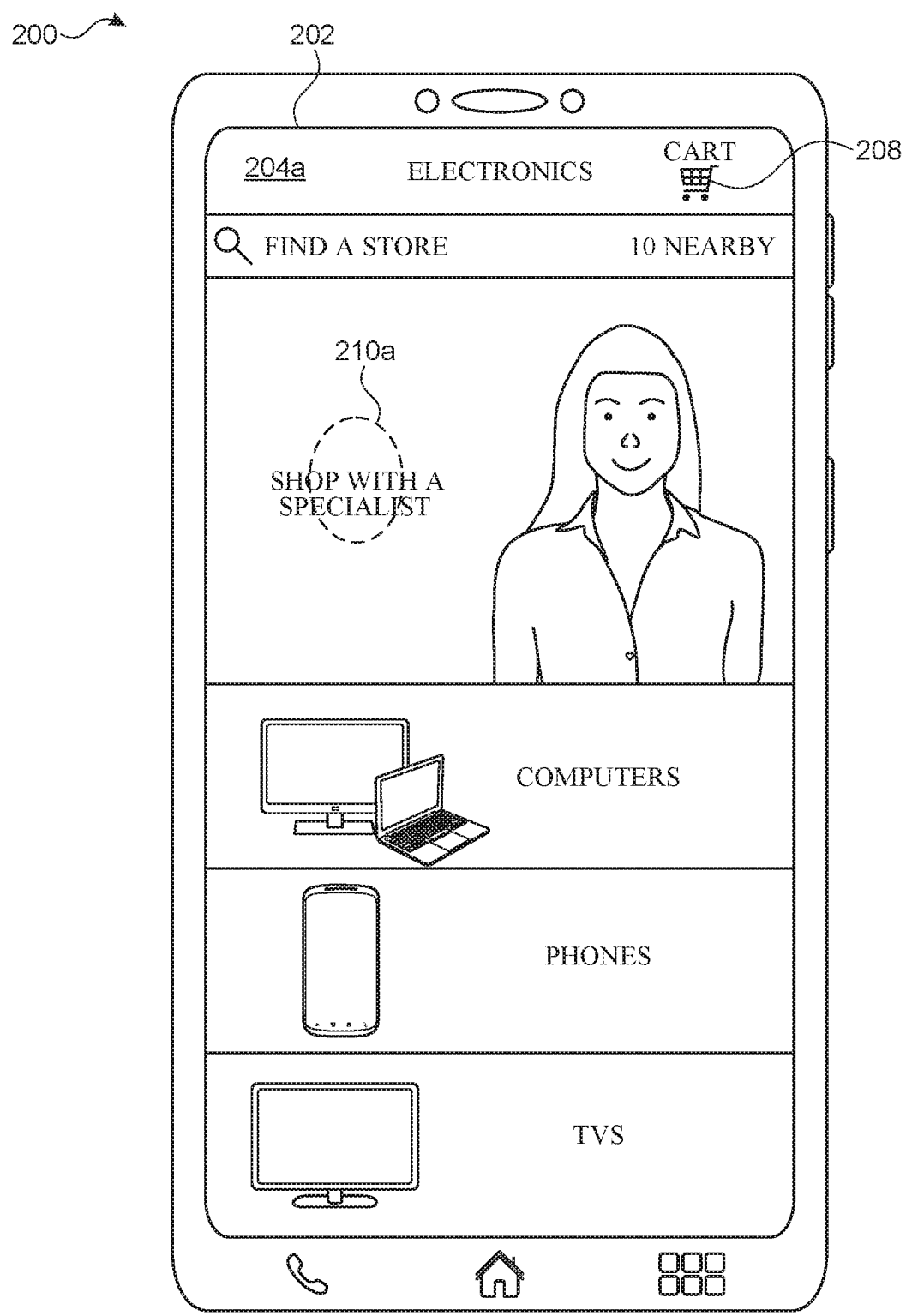
FIGS. 2A-2S illustrate user interfaces for a guided consumer experience, according to various embodiments.
Figure 2B:
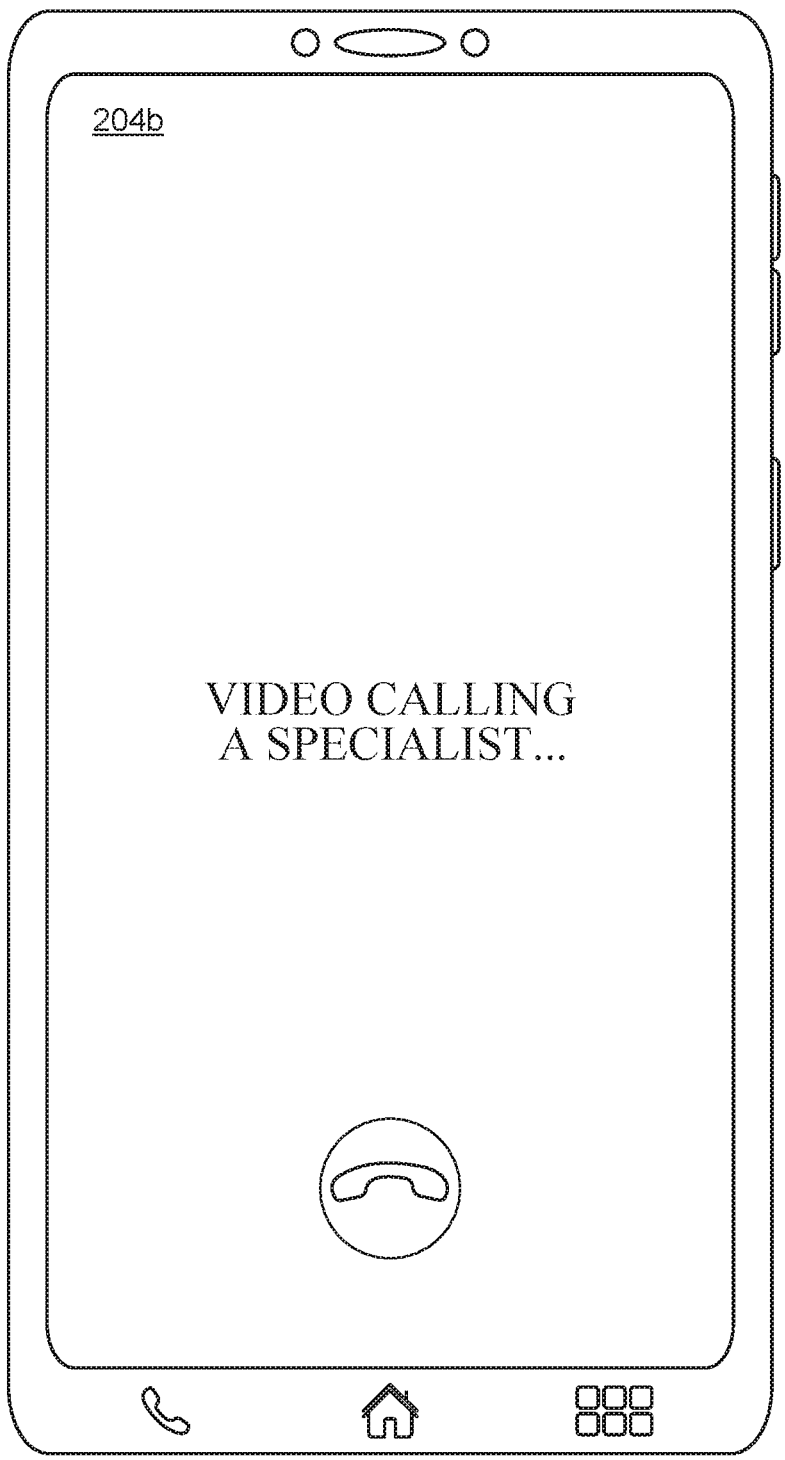
Figure 2C:
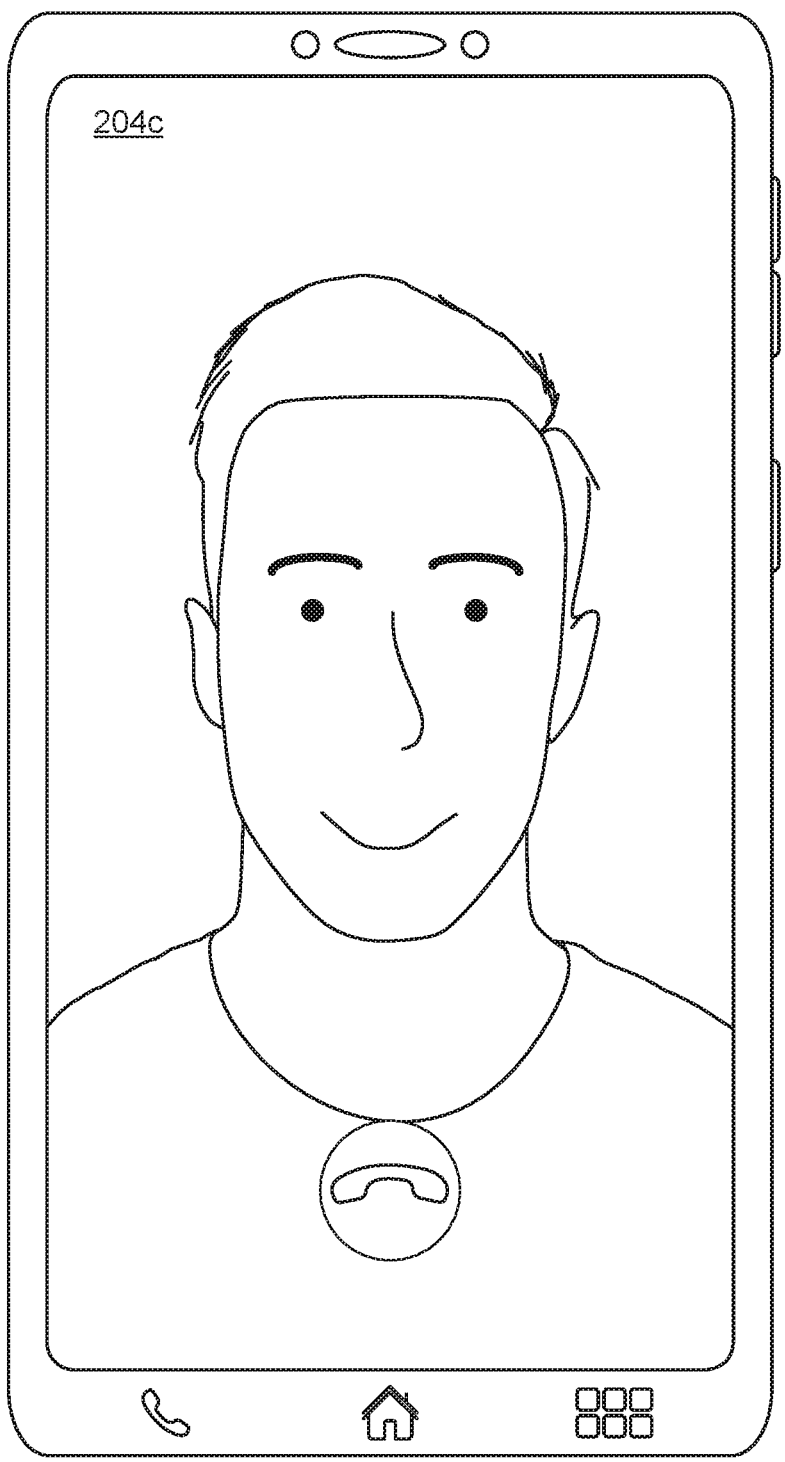
Figure 2D:
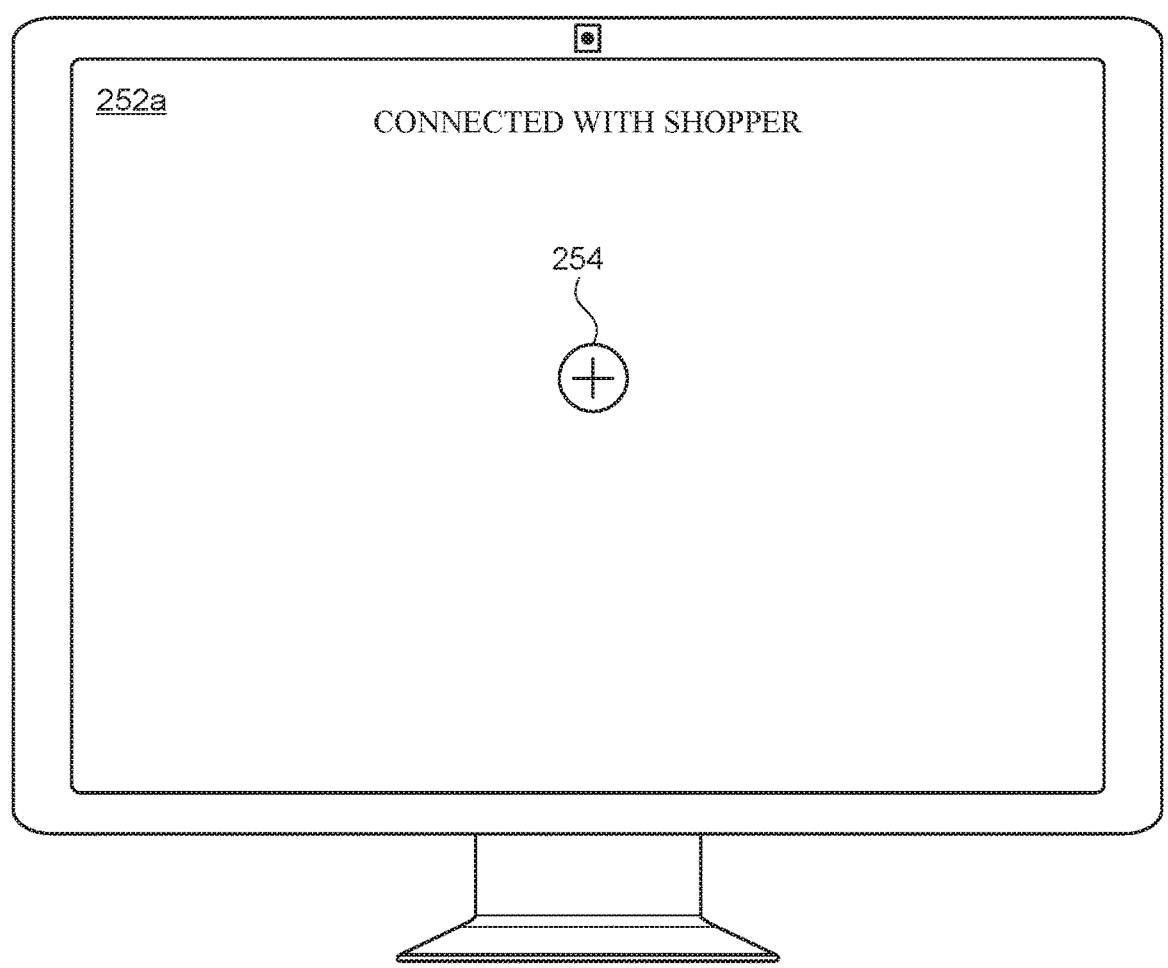
Figure 2E:
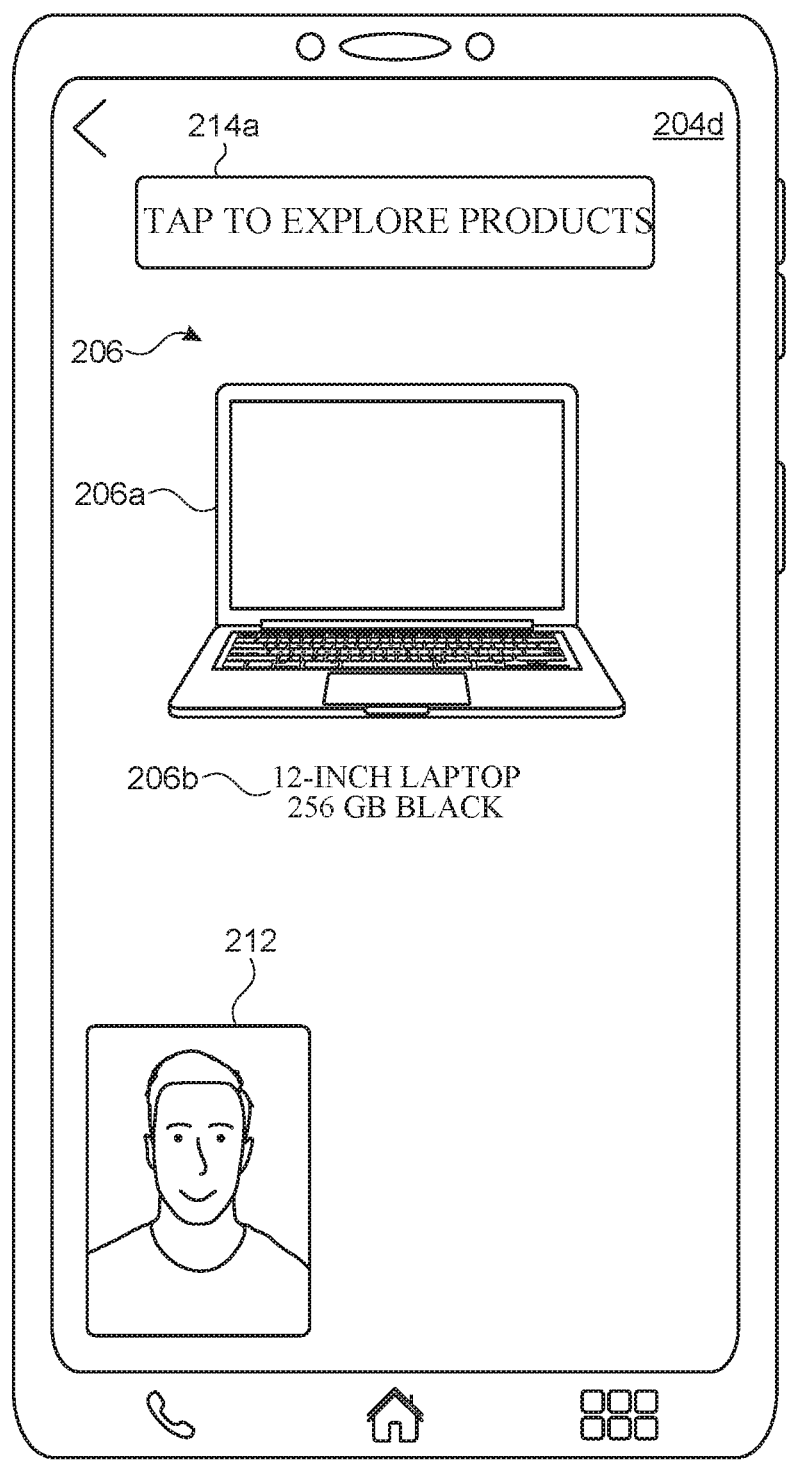
Figure 2F:
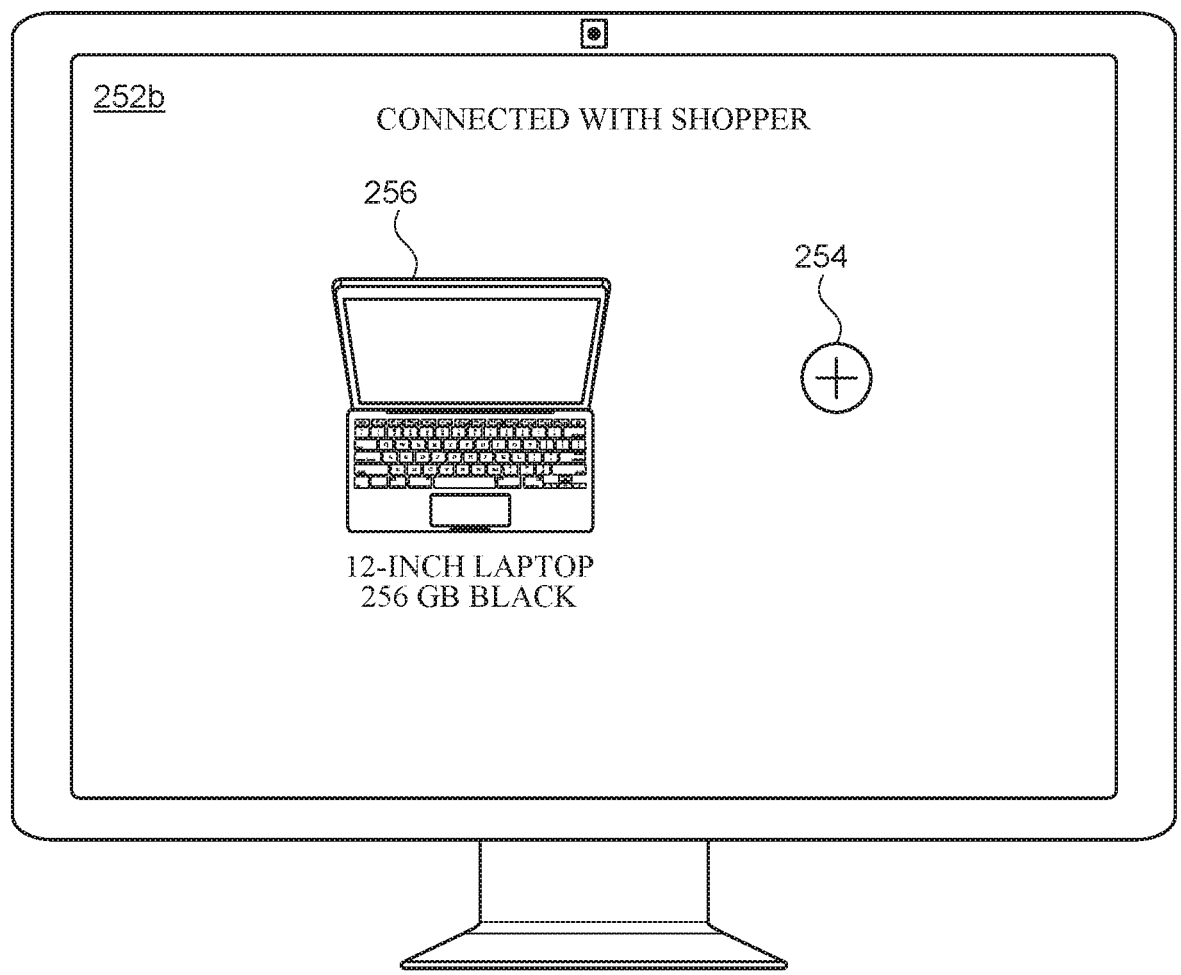
Figure 2G:
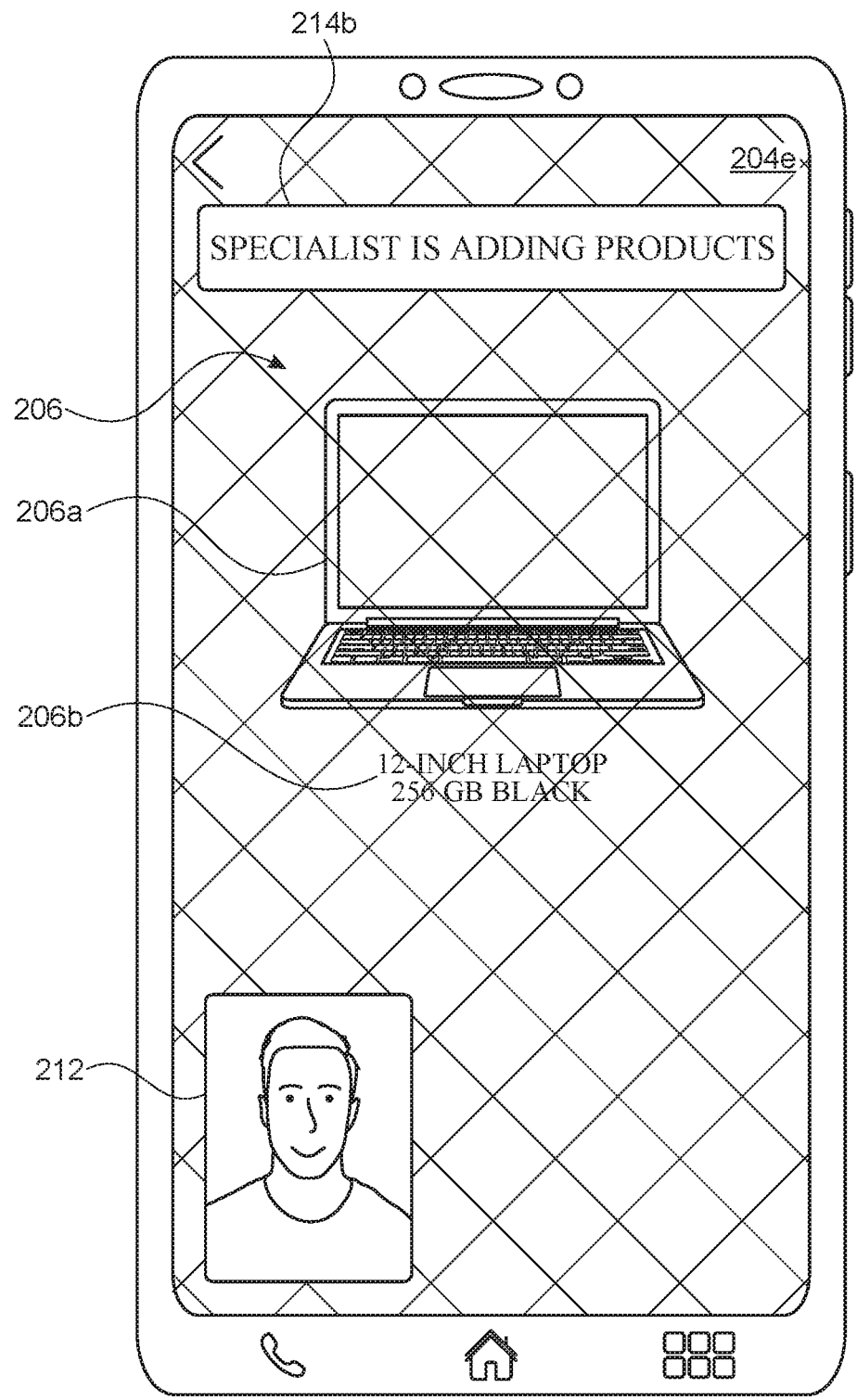
Figure 2H:
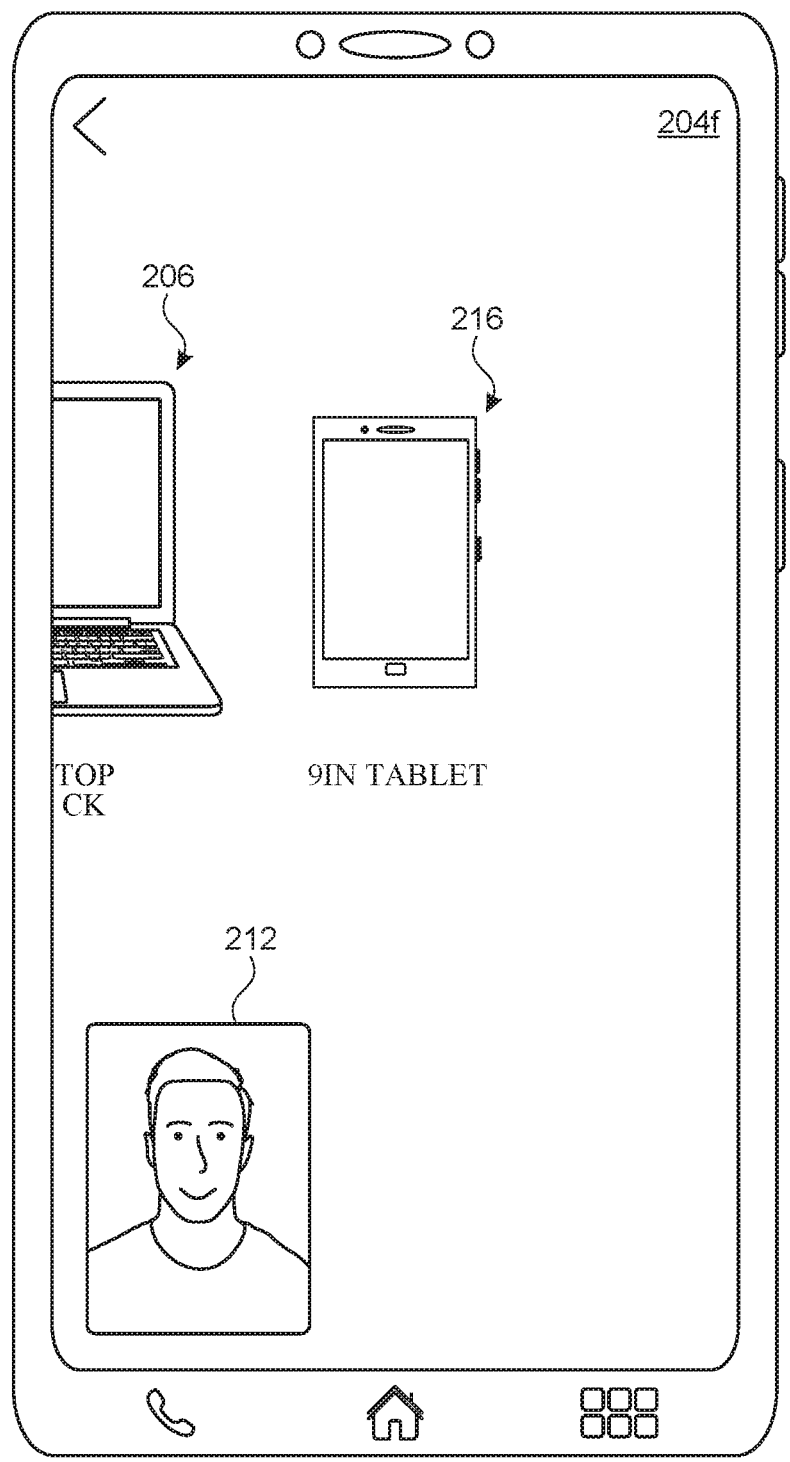
Figure 2I:
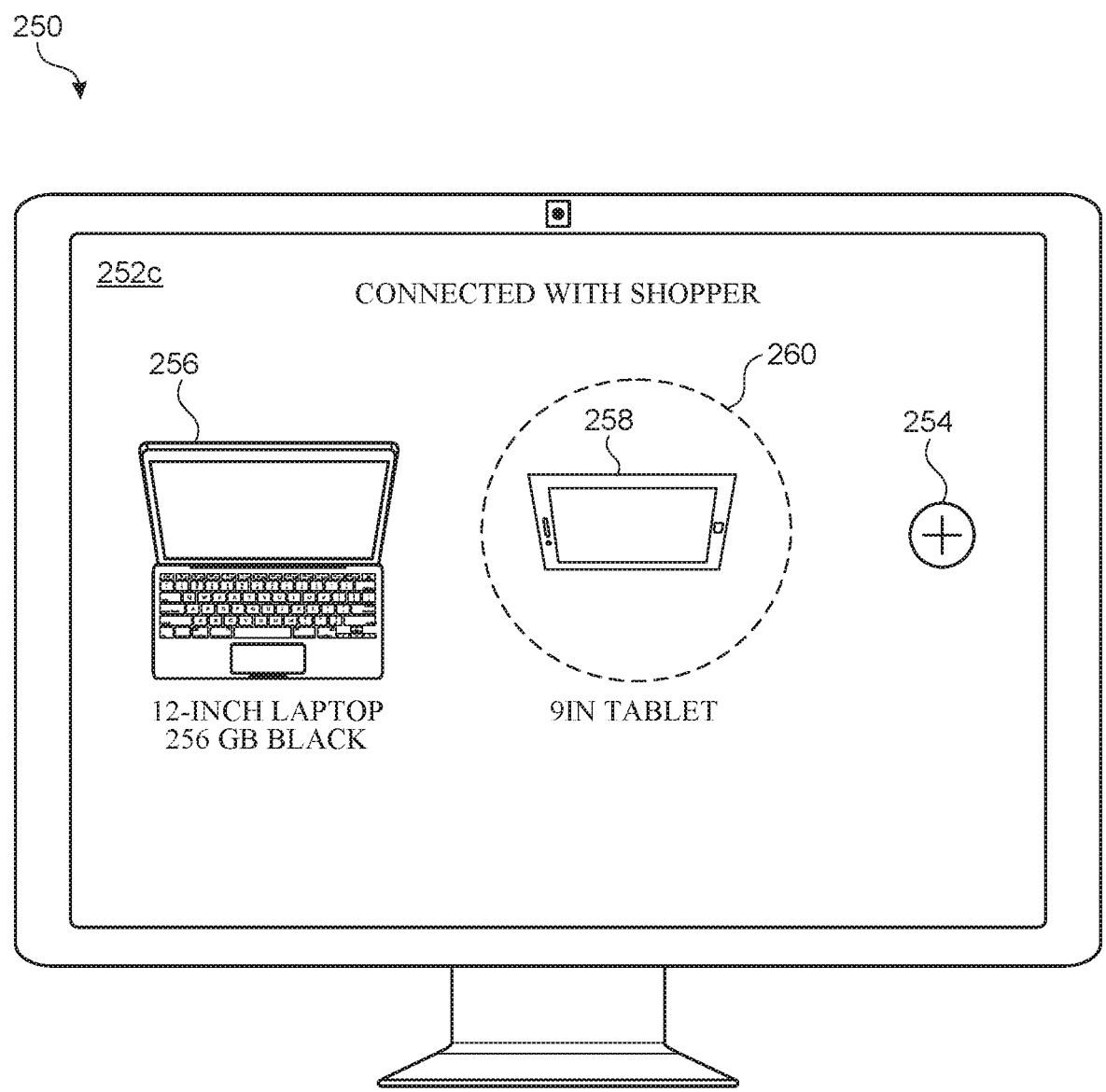
Figure 2J:
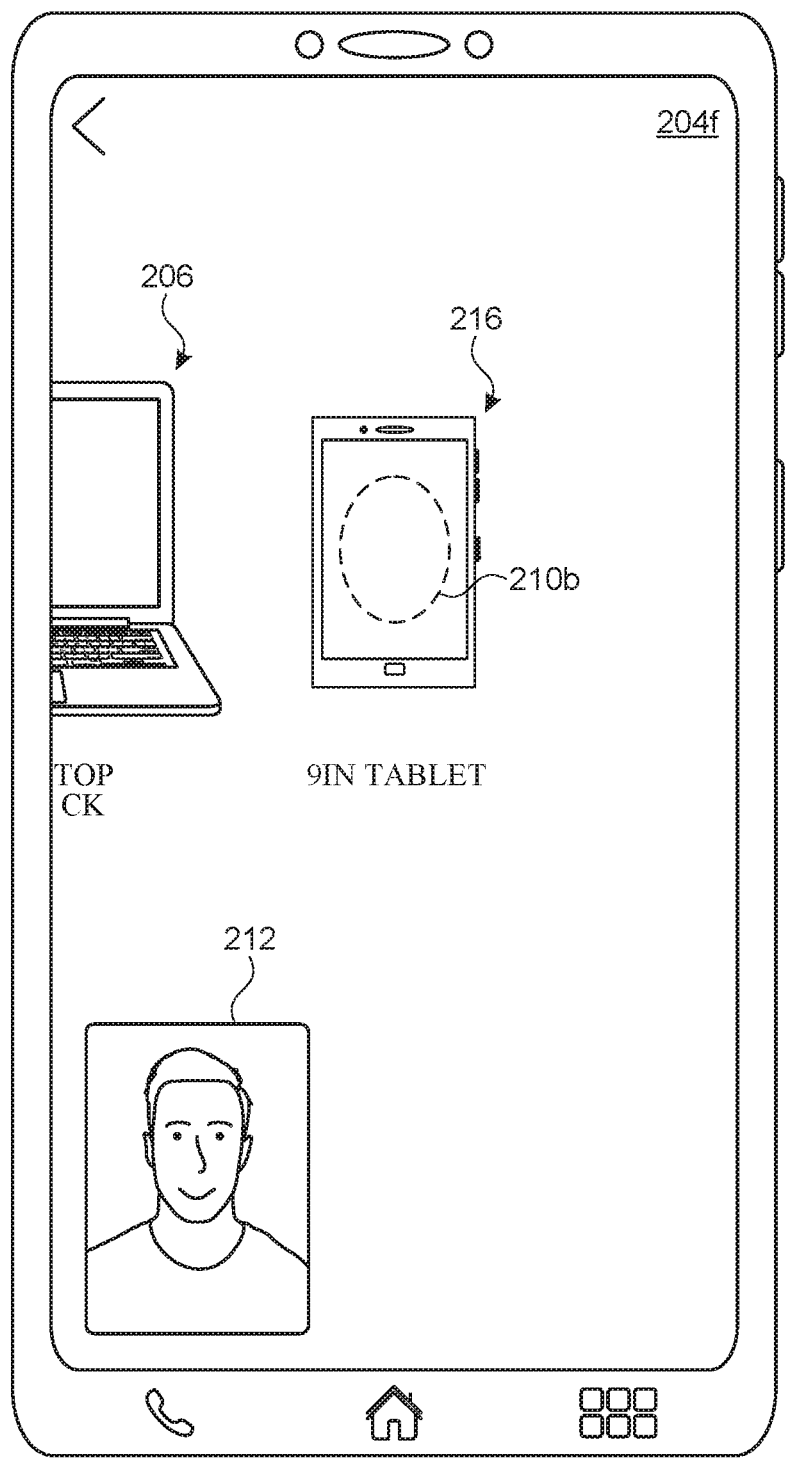
Figure 2K:
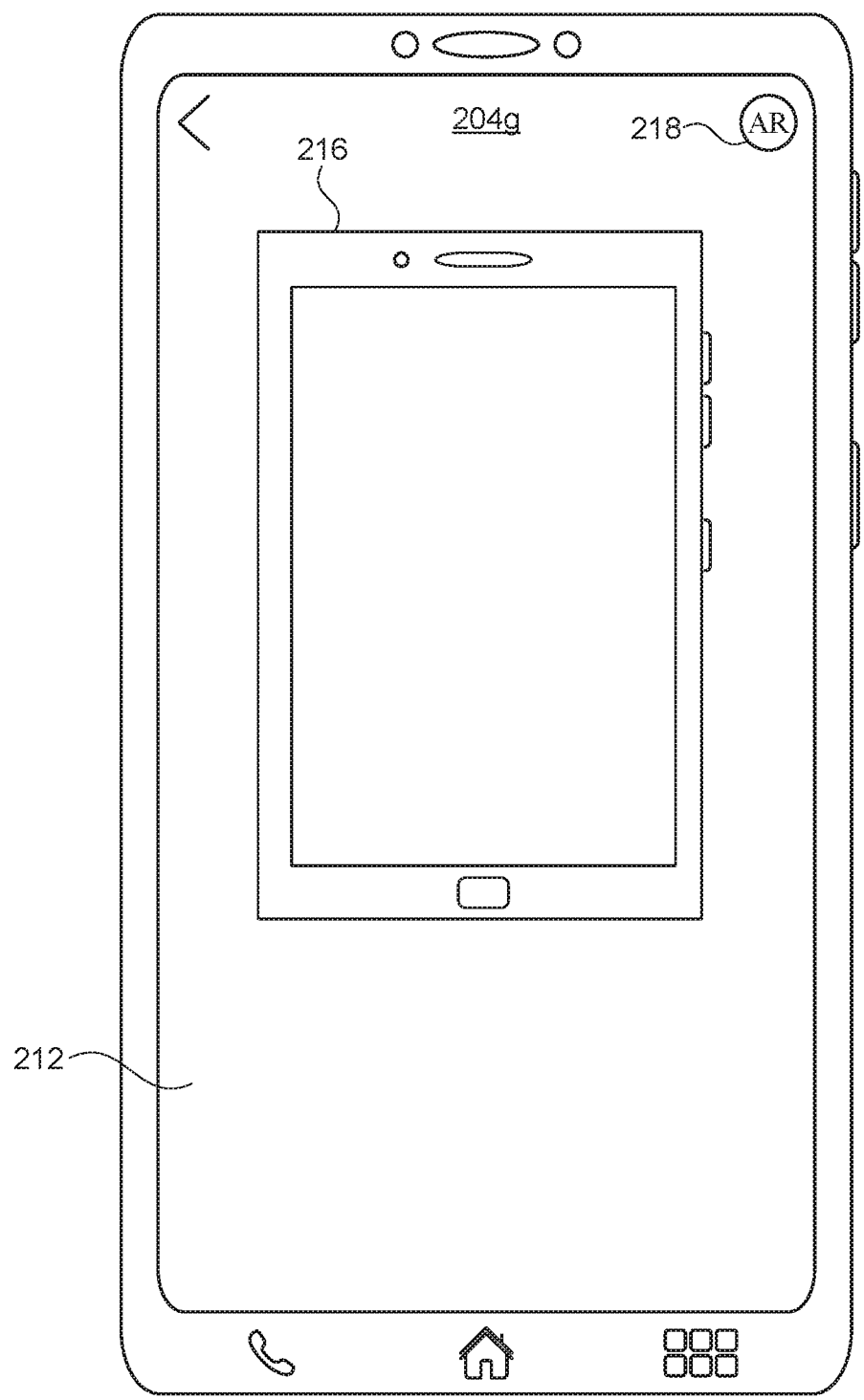
Figure 2L:
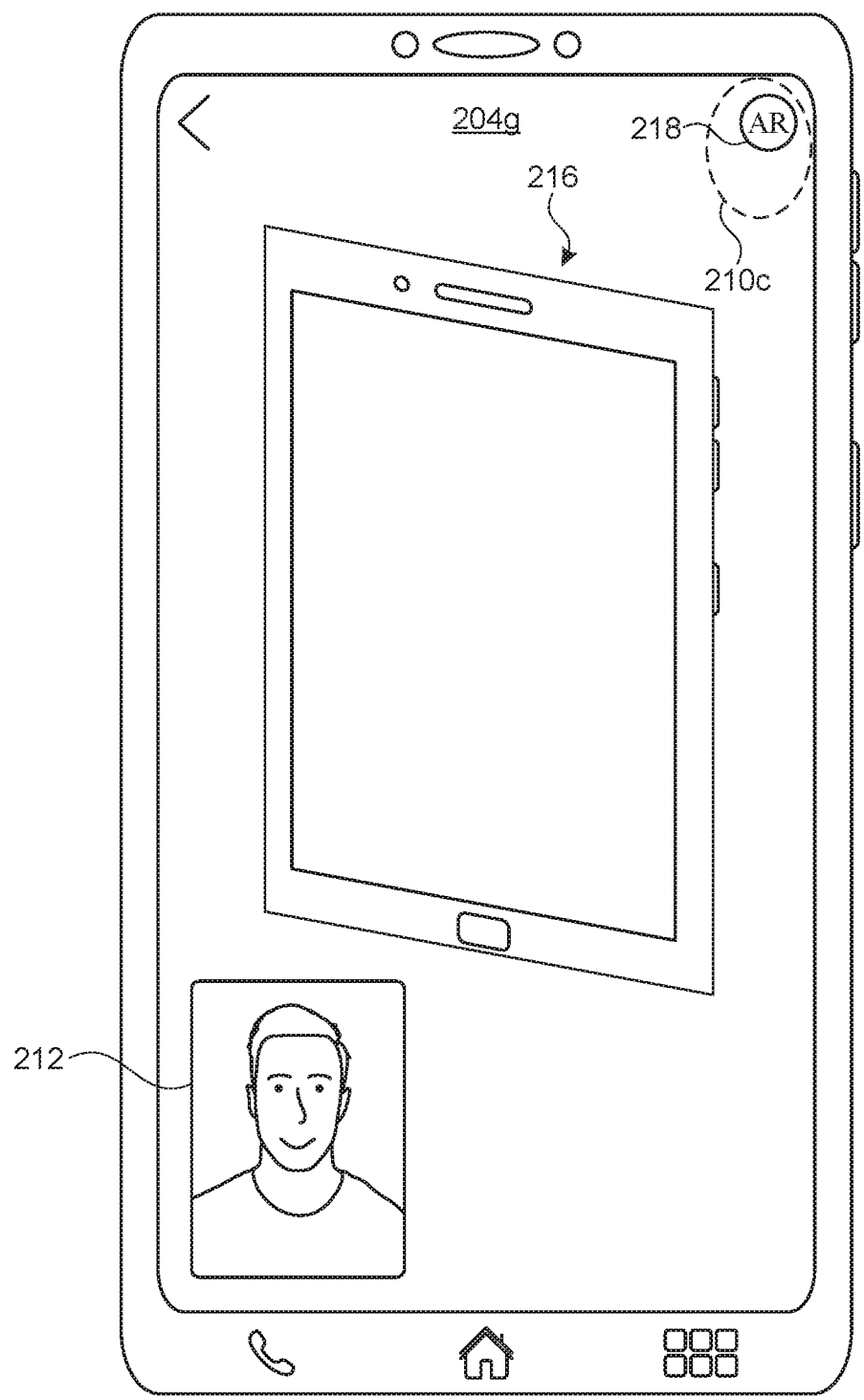
Figure 2M:
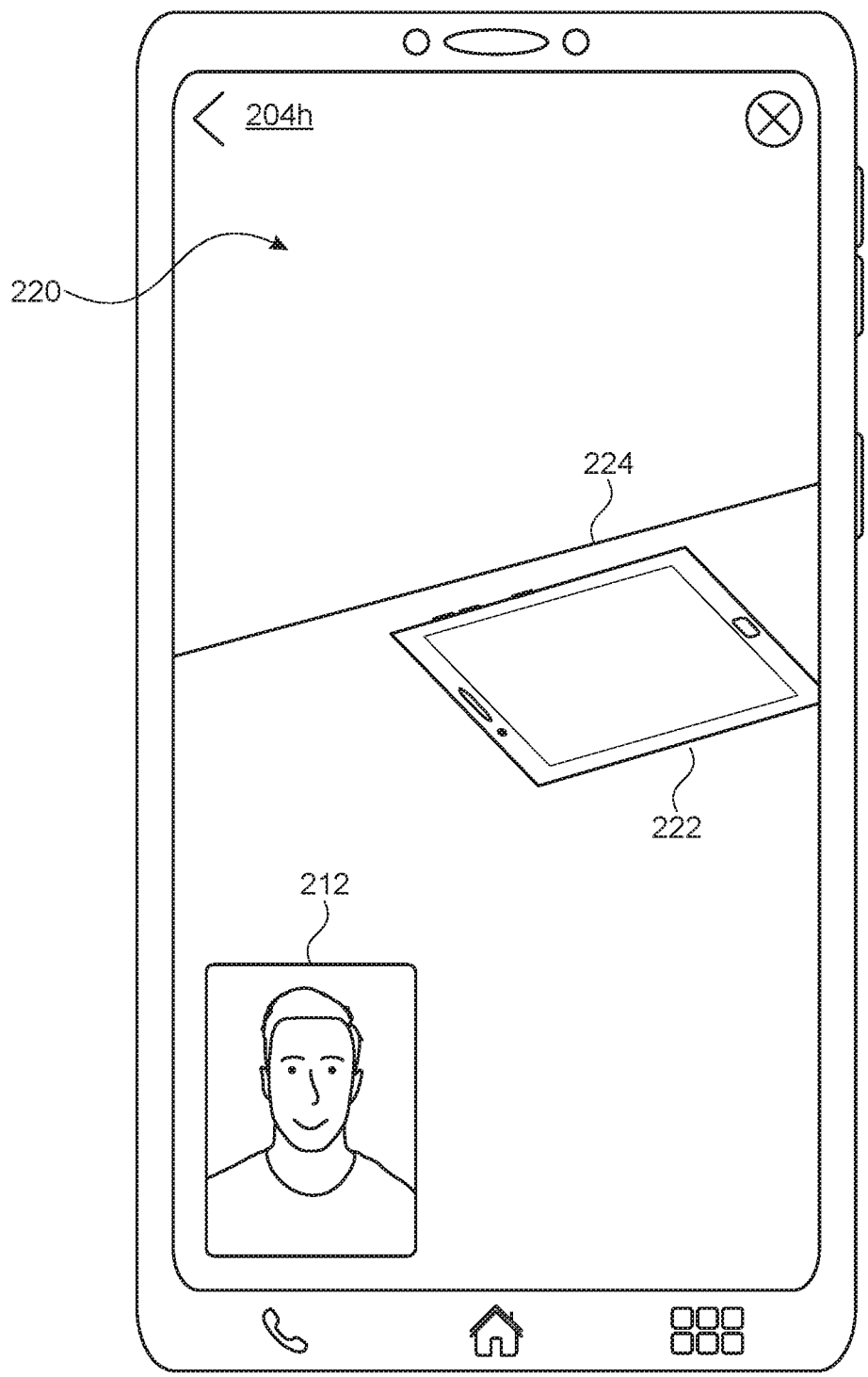
Figure 2N:
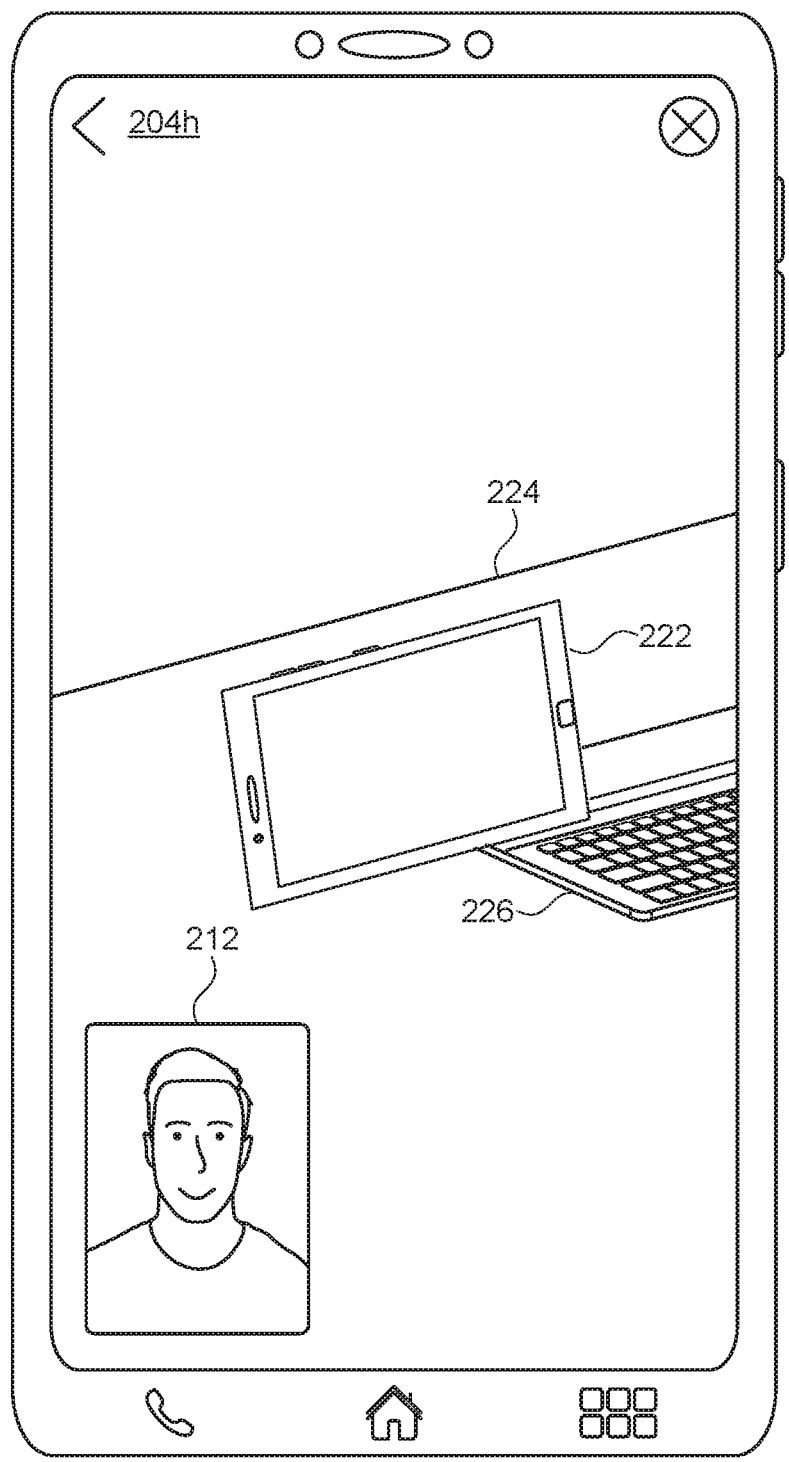
Figure 2O:
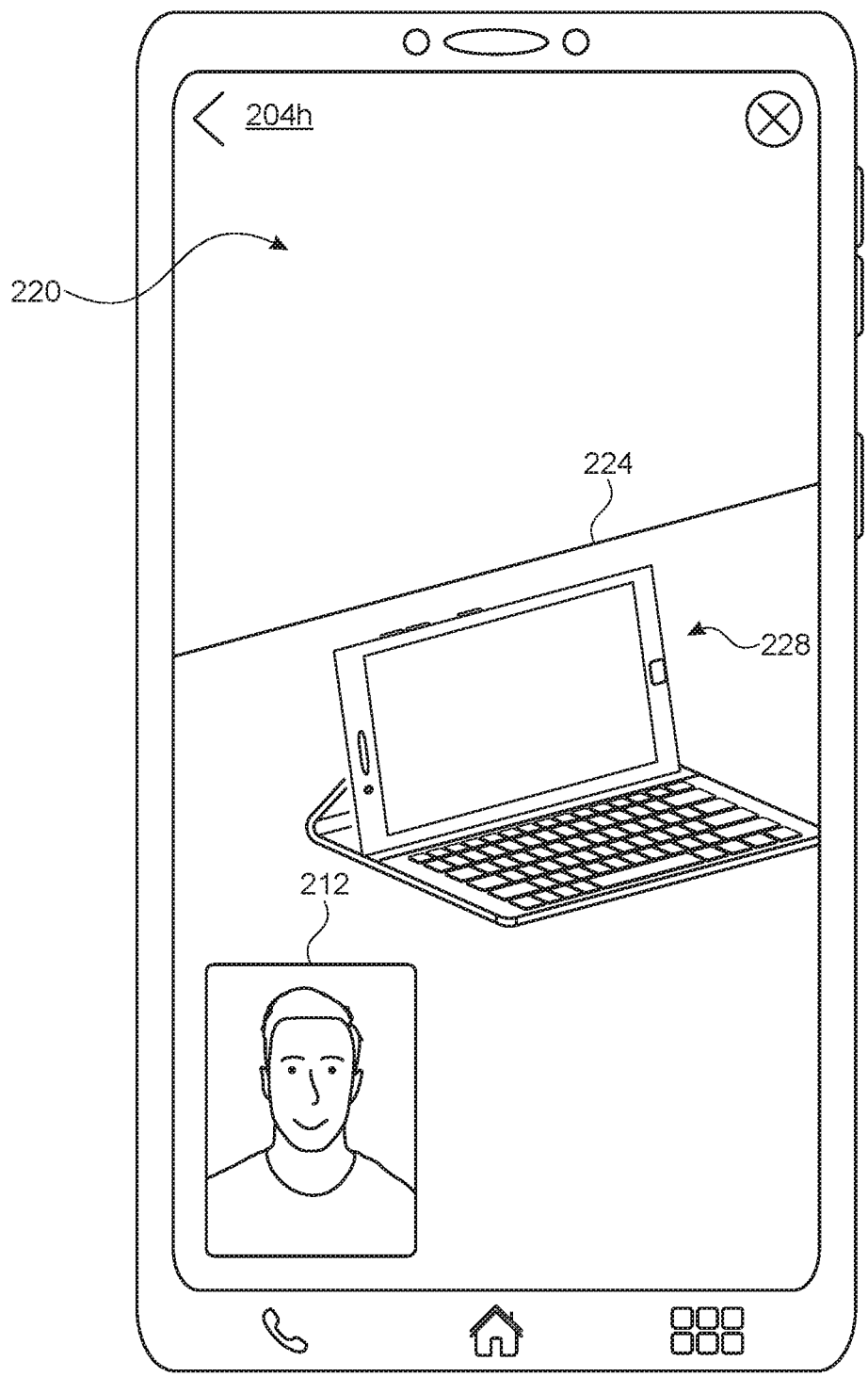
Figure 2P:
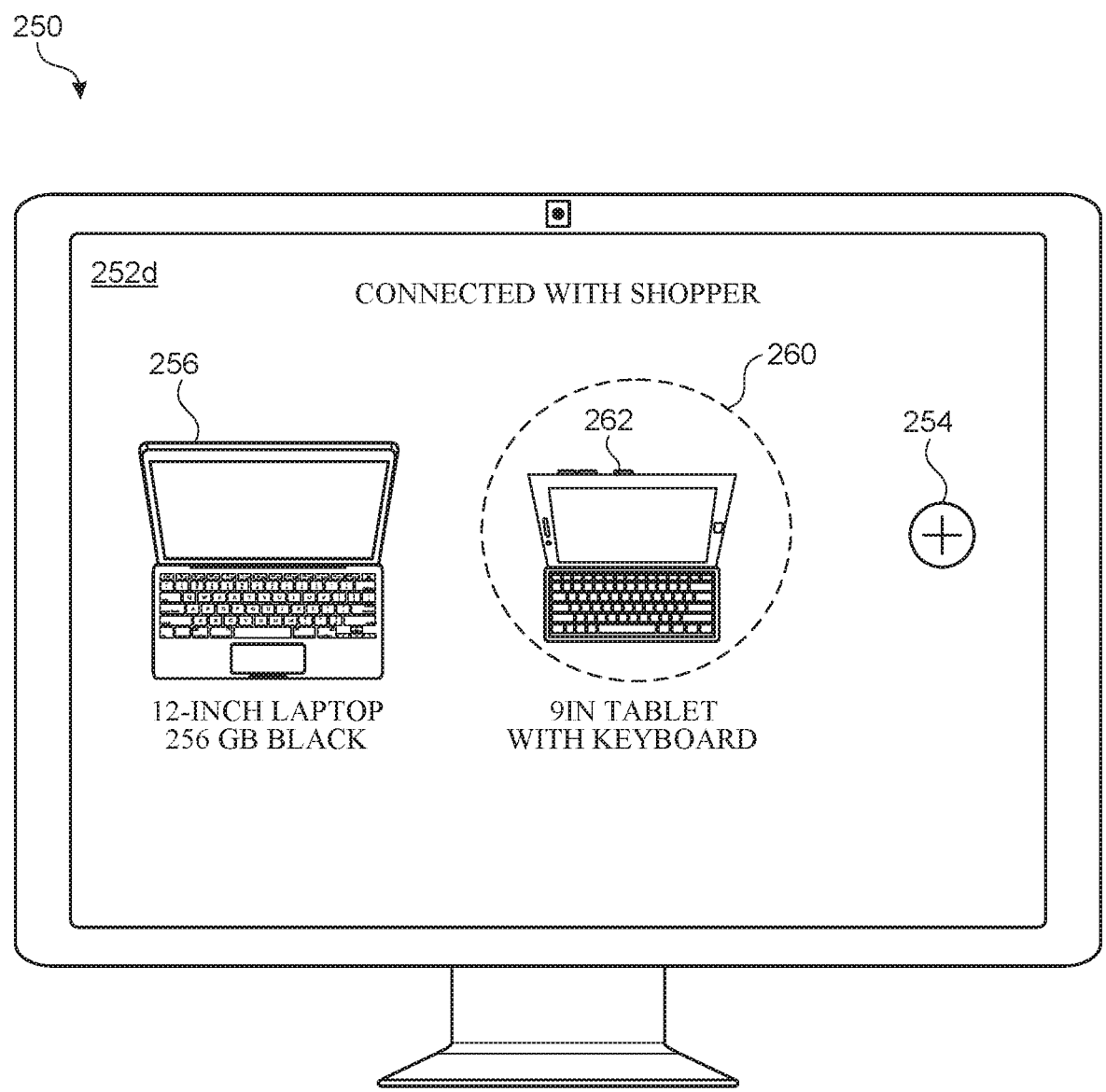
Figure 2Q:
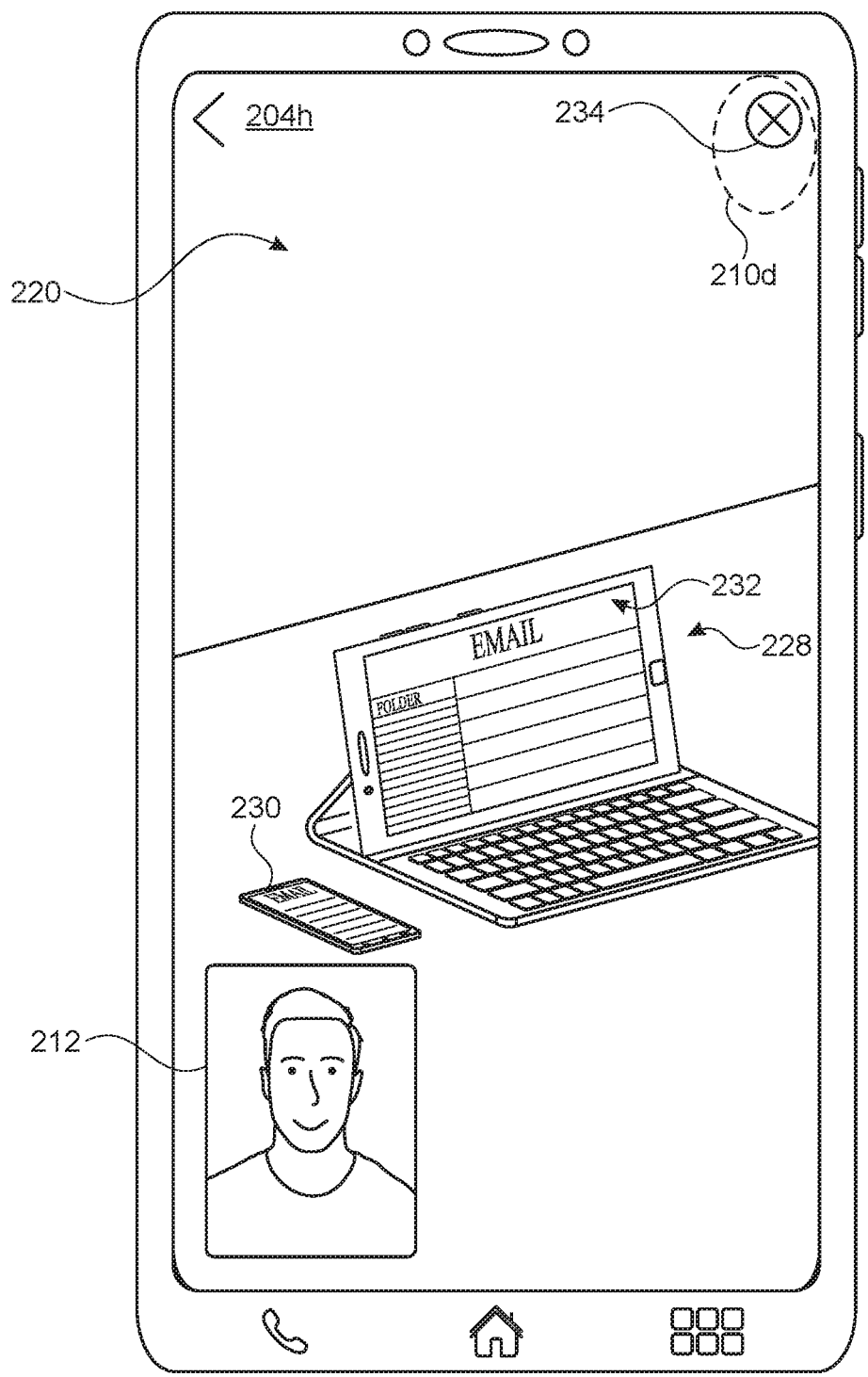
Figure 2R:
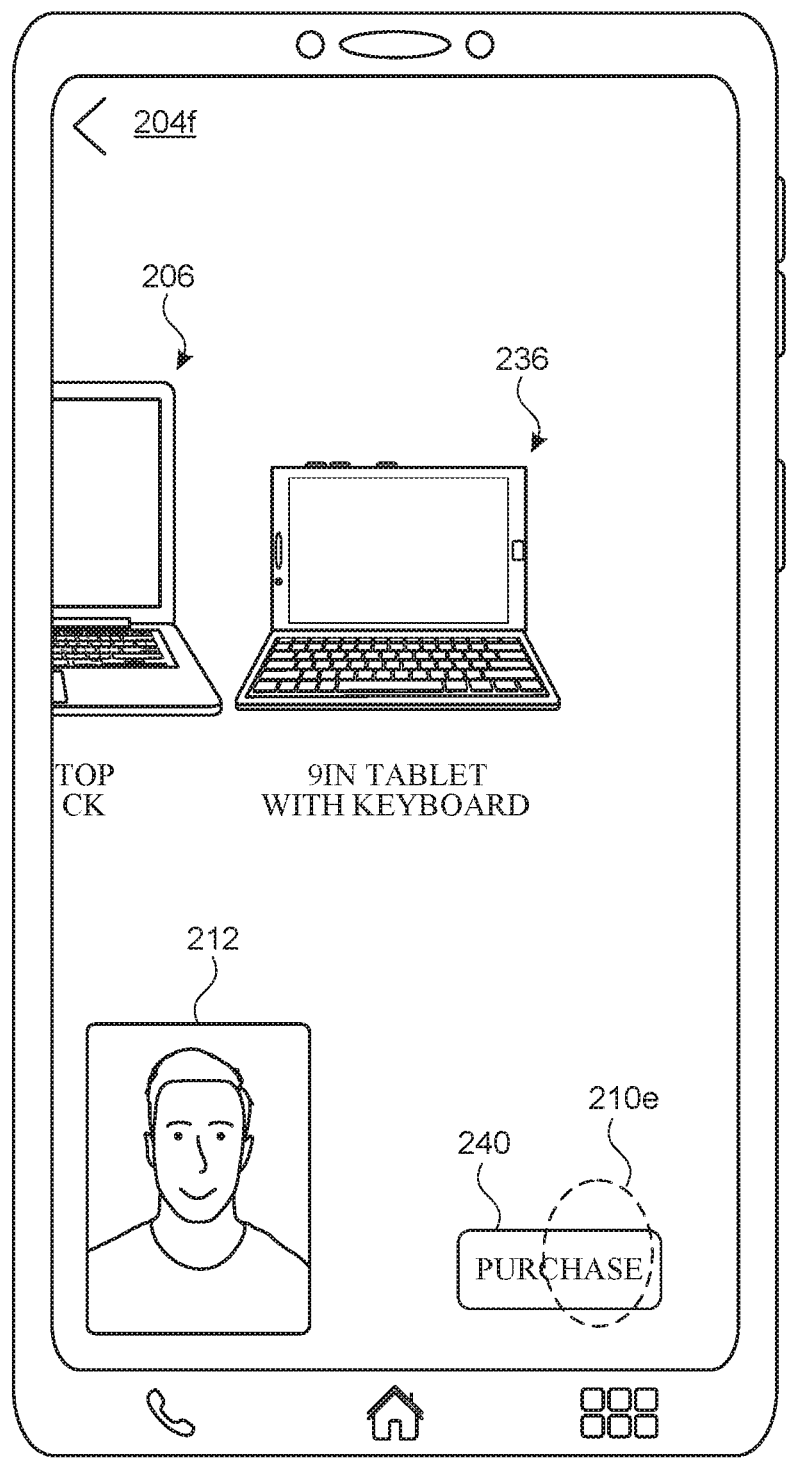
Figure 2S:
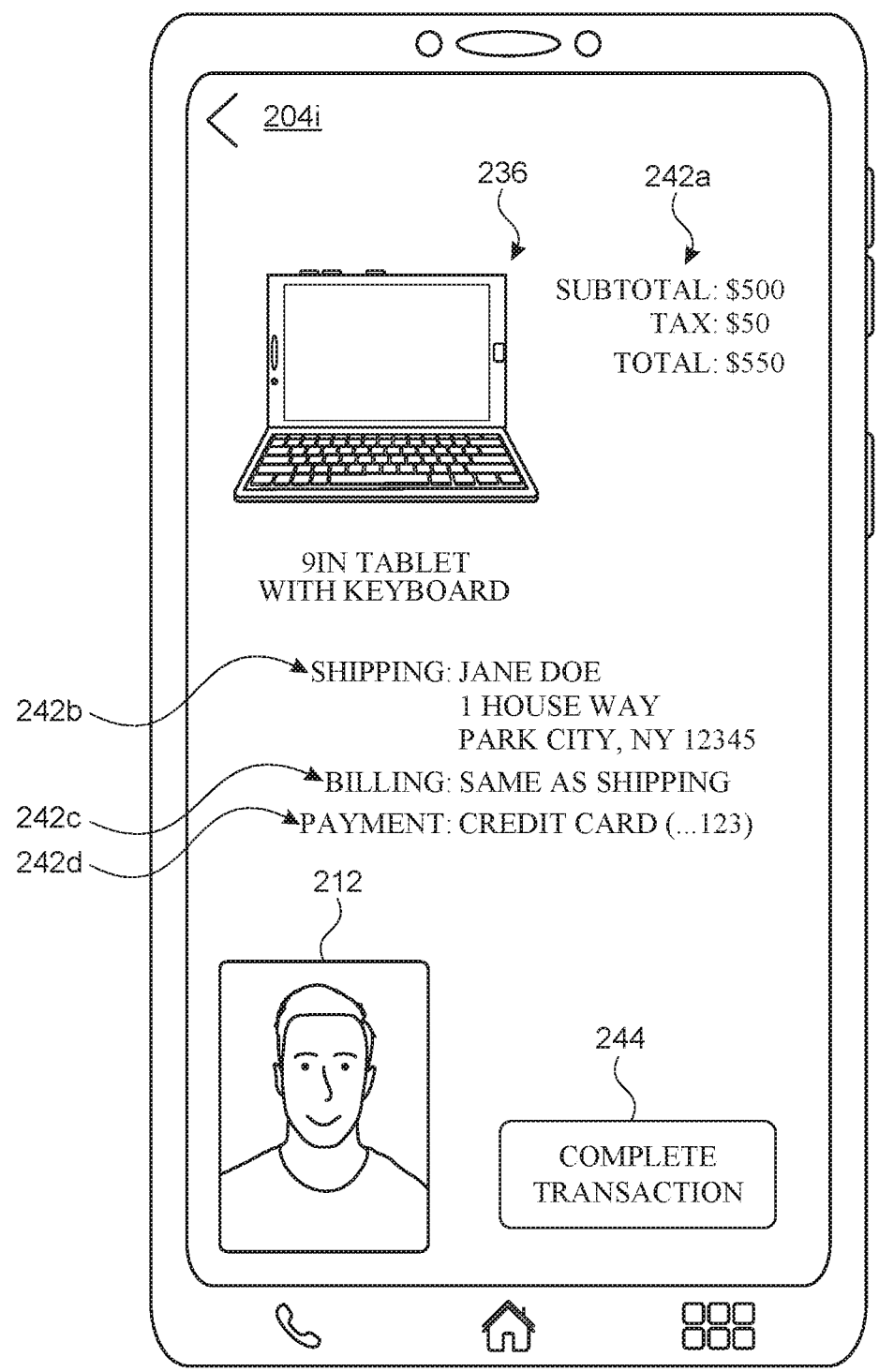

With reference now to FIGS. 2A-2S, exemplary techniques for a guided consumer experience are described.

FIG. 2A depicts electronic device 200 with display 202. In some embodiments, device 200 is a smartphone, tablet computer, laptop computer, desktop computer, or other electronic system or device with a display (e.g., device 100*a* or 100*c* in FIGS. 1A-1B). In FIG. 2A, display 202 is a touch-sensitive display. In some embodiments, device 200 is in communication with a mouse, keyboard, or other peripheral device that receives inputs.

In FIG. 2A, device 200 displays user interface 204*a* of an online shopping application, which includes user interface objects corresponding to computers, phones, and TVs. In some embodiments, the user interface objects are selectable affordances that allow a user to navigate the application (e.g., place items in a virtual cart, checkout, and pay for selected items). User interface 204*a* also includes an option to have a communication session with a salesperson. In response to receiving a user input, a communication session with a salesperson is provided. In FIG. 2A, user input 210*a* includes a contact on touch-sensitive display 202.

In response to receiving user input 210*a*, device 200 initiates a communication session with a salesperson (aka "a customer support specialist"). As shown in FIG. 2B, device 200 replaces user interface 204*a* with user interface 204*b*, which includes a visual indication that a video call with a salesperson is being initiated. In some embodiments, the communication session is a two-way video communication with two-way audio, a one-way video communication with two-way audio, or a two-way audio communication without video. In some embodiments, device 200 includes options for a user to select the type of communication provided by the session or to change the type of communication during the session.

Turning to FIG. 2C, once the communication session is established, device 200 displays user interface 204*c*, which includes video of the salesperson. In some embodiments, device 200 displays an avatar representing a salesperson. In some embodiments, device 200 displays user interface 204*c* in response to receiving user input 210*a*, without displaying user interface 204*b*.

While providing the communication session, a user of device 200 can have a video and/or audio conversation with the salesperson. The salesperson can guide the user through a shopping experience, remotely controlling aspects of the user's display.

In some embodiments, while providing the communication session, device 200 displays product information using information received from the communication session. For example, if the user of device 200 indicates to the salesperson interest in a laptop computer, the salesperson can cause (e.g., via a server or a device local to the salesperson but remote to device 200) information to be sent via the communication session that causes an image of a laptop to be displayed on device 200 along with other product information. In some embodiments, in response to information received from the communication session (e.g., initiation by the salesperson via a remote device or server), device 200 displays product information of items included in a user's virtual shopping cart on the application.

FIG. 2D illustrates an exemplary user interface 252*a* displayed at device 250, which is local to the salesperson but remote to device 200. User interface 252*a* includes affordance 254. In response to selection of affordance 254, device 250 initiates a process that causes the image of a product to be displayed on device 200. In some embodiments, in response to receiving selection of affordance 254, device 250 displays one or more other user interfaces, user interface menus, and/or affordances that allow the salesperson to select a product (e.g., a laptop) for display at device 200. In some embodiments, in response to selection of affordance 254, device 250 causes an image of one or more products included in a virtual shopping cart of the user (consumer) to be displayed at device 200.

In FIG. 2D, user interface 252*a* does not include an image or video captured by device 200 (e.g., a live video feed of the user from the user's device). For example, the communication session provides the salesperson with audio from device 200 but does not provide video in order to maintain a user's privacy. In some embodiments, the communication session provides video from device 200 to device 250, and the video is displayed on user interface 252*a*.

In the illustrated embodiment, in response to receiving information from the communication session, device 200 displays product information by replacing user interface 204*c* with user interface 204*d*, shown in FIG. 2E. User interface 204*d* includes product information 206, including image 206*a* of a laptop computer and descriptive text 206*b* ("12-INCH LAPTOP" and "256 GB BLACK"). On device 250 (e.g., the salesperson's device), user interface 252*b* is displayed, which includes product information 256 corresponding to the product information displayed at device 200, as shown for example in FIG. 2F.

In some embodiments, the information from the communication session is provided in response to input from the salesperson (e.g., via a remote device or server). In some embodiments, device 200 displays user interface 204*d* in response to receiving input at device 200. For example, device 200 can display user interface 204*d* in response to a contact on touch-sensitive display 202 (e.g., a contact on CART icon 208; in some embodiments, CART icon 208 is displayed on user interface 204*a*, 204*b*, and/or 204*c*). In some embodiments, device 200 displays user interface 204*d* in response to a voice input received by device 200 (e.g., "Show my cart").

In FIG. 2E, user interface 204*d* includes image 212 of the salesperson. Image 212 provides context by indicating to the user of device 200 that the communication session continues to be provided while the product information is displayed. In some embodiments, user interface 204*d* (and/or user interfaces 204*e*, 204*f*, 204*g*, and/or 204*h* described below) does not include image 212 of the salesperson. In some embodiments, device 200 does not display an image (or representation) of the salesperson more generally (e.g., if the communication session includes only audio from the salesperson). In some embodiments (e.g., if the communication session includes only audio from the salesperson), device 200 displays user interface 204*d* in response to receiving user input 210*a* in FIG. 2A, without displaying an image (or representation) of the salesperson (e.g., without including image 212 in user interface 204*d* and/or without displaying user interface 204*c*).

User interface 204*d* also includes user interface object 214*a* (e.g., an affordance) that allows a user of device 200 to explore other product (e.g., by tapping a location on touch-sensitive display 202 corresponding to user interface object 214*a*).

In some embodiments, device 200 displays additional product information using additional information received from the communication session. For example, similar to the way in which a salesperson can cause display of product information 206 (e.g., laptop and related information) on user interface 204d in FIG. 2E, the salesperson can initiate (e.g., via a remote device or server) display of another product. For example, the salesperson can take action that causes information to be sent to device 200 via the communication session that device 200 uses to display another product. In FIG. 2F, for example, the salesperson can select affordance 254 to initiate display of additional product information.

In the illustrated embodiment, device 200 displays user interface 204e to indicate that the salesperson is adding a product to the display, as shown in FIG. 2G. In some embodiments, device 200 displays user interface 204e while device 200 and/or remote servers process the salesperson's request to add the additional product information (e.g., while the additional product information is being retrieved from a database). User interface 204e is a modified version of user interface 204d. Compared to user interface 204d, product information 206 and the background is greyed out and user interface object 214a is replaced with user interface object 214b, which indicates that the salesperson is adding products to the display. As used herein, "displaying a product" means displaying a representation (e.g., an image or virtual object) and/or information of the product. Similarly, "adding a product" means displaying a representation and/or information of an additional product.

FIG. 2H illustrates an exemplary user interface 204f that includes additional product information 216 for a 9-inch tablet computer. In some embodiments, user interface 204f is displayed in response to user input received at device 200 (e.g., if there are multiple products in the user's virtual shopping cart, or the user navigates to a user interface for selecting additional products and selects another product). In the illustrated embodiment, user interface 204f initially displays additional product information 216 horizontally centered on display 202, with product information 206 displayed, but partially hidden (e.g., off the left edge of display 202). Various arrangements of product information 206 and additional product information 216 are possible (e.g., horizontally arranged, vertically arranged, both fully displayed, overlapping, etc.). On device 250 (e.g., the salesperson's device), user interface 252c is displayed, which includes product information 256 and 258 corresponding to the product information displayed at device 200, as shown for example in FIG. 2I. User interface 252c on device 250 includes focus indicator 260, which indicates that the tablet computer is in focus (e.g., the center position) on device 200 (e.g., the consumer's device).

While displaying user interface 204f, device 200 receives data indicating a selection of the tablet computer. In some embodiments, the data indicating selection of a product is included in information received from the communication session (e.g., the salesperson selects the laptop via a remote device or server(s), which communicates the selection via the communication session). In FIG. 2J, the data indicating selection of the tablet includes contact 210b on touch-sensitive display 202 at a location corresponding to additional product information 216 representing the tablet.

In response to receiving the data indicating selection of the tablet, device 200 visually distinguishes additional product information 216 to indicate that the tablet has been selected. In some embodiments, additional product information 216 is visually emphasized by highlighting additional product information 216, enlarging additional product information 216, outlining additional product information 216, greying out other portions of user interface 204f (e.g., product information 206 and/or the background), and/or removing other portions of user interface 204f. In FIG. 2K, device 200 emphasizes additional product information 216 by enlarging the representation of the tablet and removing the representation of the laptop, while maintaining image 212 of the salesperson. In some embodiments, enlarging image 216 of the selected product includes an animation in which image 216 is enlarged and appears to move in a direction normal to display 202 (e.g., closer to the user).

In some embodiments, representation 216 includes a virtual object (e.g., a three-dimensional representation of the tablet that can be rotated and enlarged by the user or the salesperson). In some embodiments, in response to receiving the data indicating a selection of the tablet, device 200 displays a virtual object (e.g., replaces image 216 with a virtual object).

In some embodiments, both the user of device 200 and the salesperson can adjust the display of product information (e.g., 216). For example, device 200 can adjust the display of product information using information received from the communication session, e.g., via input by the salesperson on a remote device. Device 200 can also adjust the display of product information in response to input received at device 200. For example, a user can provide inputs on touch-sensitive display 202 to enlarge, shrink, and/or rotate the display of product information. Adjusting the display of product information can include adding product information (as discussed above) and removing product information.

In the illustrated embodiment, device 200 adjusts the display of product information by rotating the representation of the tablet (e.g., image 216), as shown in FIG. 2L compared to FIG. 2K. In some embodiments, device 200 adjusts the display of the tablet using information from the communication session as a result of the salesperson causing the product to move. In this way, the salesperson can manipulate the display of the selected product, e.g., to show the user of device 200 certain features of the product. Alternatively, or in addition, the user of device 200 can manipulate the display of the product, e.g., to see different portions of the product. In some embodiments, the product can be displayed in only predetermined configurations (e.g., size and/or orientation). Furthermore, since the communication session is provided throughout this process, the user and salesperson can have an on-going conversation while both interchangeably manipulate the image of the selected product. The user can ask questions or tell the salesperson what he or she would like to see, and the salesperson can answer questions, point out features, and ask the user of device 200 questions to determine what the user of device 200 is interested in seeing.

Referring again to FIGS. 2K-2L, in response to selection of the product (e.g., input 210b in FIG. 2J), device 200 displays user interface object 218 (e.g., an affordance) that can be selected to activate a computer-generated reality mode in which the selected product is displayed in a CGR environment. For example, in response to receiving user input 210c (e.g., a touch at user interface object 218 as shown in FIG. 2L), device 200 displays a representation of the selected product in a CGR environment. In some embodiments, device 200 displays the representation of the product in CGR by capturing an image using a camera (e.g., a camera on the back of device 200), generating a CGR environment by compositing a virtual object representing the product and the captured image, and displaying the generated CGR environment. In some embodiments, at least a portion of the process of displaying the representation of the product in CGR is performed at a device other than device 200 (e.g., a device in communication with device 200, such as a device paired to device 200 (e.g., via Bluetooth communication) or a device in the same network as device 200 (e.g., a LAN or Wi-Fi network), receives the captured image and composites the virtual object and the captured image).

FIG. 2M illustrates an embodiment of a user interface 204h that includes an exemplary CGR environment 220. To generate CGR environment 220 in FIG. 2M, device 200 captures an image of the surrounding physical environment (e.g., using a rear-facing camera) and composites virtual object 222 representing the product (tablet) and the image of the physical environment. In some embodiments, the display of virtual object 222 is based on features in the captured image (e.g., device 200 determines a scale, position, orientation, shading, or other feature of the virtual object based on characteristics of the captured image). In FIG. 2M, virtual object 222 is displayed such that the tablet appears to be lying on table 224. For example, the captured image can be analyzed to identify objects (such as table 224) and their position(s), and then the CGR environment can be generated such that the virtual object is displayed at a realistic location in the physical environment. In some embodiments, the position of the virtual object remains fixed relative to the physical environment such that a user of device 200 can direct the camera of device 200 toward different portions of the physical environment while virtual object 222 remains displayed at the same position on table 224.

In some embodiments, device 250 (e.g., the salesperson's device) displays a user interface object indicating that device 200 has entered a CGR mode. In some embodiments (e.g., to maintain user privacy), the image and/or video captured by device 200 to generate the CGR environment is not provided and/or displayed at device 250. Instead, for example, device 250 maintains the view illustrated in FIG. 2I. In some embodiments (e.g., if the user of device 200 affirmatively agrees to share the image(s) captured by device 200), device 250 displays CGR environment 220.

In some embodiments, additional products and/or product demonstrations are displayed in the CGR environment. FIGS. 2N-2O illustrate an exemplary animation of a keyboard (e.g., a virtual object representing a keyboard) being added to CGR environment 220. As shown, virtual object 222 representing the tablet is rotated to be upright to the position in which it will sit when configured with the keyboard, and virtual object 226 representing the keyboard translates into position from the right edge of display 202 under the tablet such that the keyboard appears to lie flat on table 224. In some embodiments, the tablet and keyboard are represented by a single virtual object 228. In some embodiments, device 200 ceases to display virtual object 222 representing solely the tablet and displays combined virtual object 228 (e.g., without an animation).

In some embodiments, the salesperson causes additional products and/or product demonstrations to be displayed in the CGR environment (e.g., without device 200 receiving input from the user). For example, the user of device 200 could tell the salesperson via the communication session that he or she is interested in a keyboard for the tablet represented by virtual object 222, or the salesperson could recommend a keyboard to the user. The salesperson can initiate the addition of the desired products via input on a remote device (e.g., by selecting affordance 254 on device 250), and the display of the CGR environment is adjusted using information received from the communication session. In some embodiments, additional products and/or demonstrations are displayed in the CGR environment in response to device 200 receiving user input (e.g., a voice command or a touch input on touch-sensitive display 202). In some embodiments, both the user of device 200 and the salesperson can initiate display of a device in the CGR environment. After the keyboard is added, device 250 (e.g., the salesperson's device) can display user interface 252d, which includes product information corresponding to the product information displayed at device 200, including product information 262 corresponding to the tablet and keyboard combination, as shown for example in FIG. 2P.

FIG. 2Q illustrates an example in which another virtual object is added to CGR environment 220 and a virtual demonstration is displayed. Virtual object 230 representing a smartphone (e.g., device 200) is displayed with virtual object 228 of the combined tablet and keyboard. For example, the salesperson may know what type of device the user owns or is using based on a user profile associated with device 200 or information provided via the communication session by device 200. In the illustrated embodiment, a virtual demonstration of a software product 232 (e.g., an e-mail application) is displayed on the screens of virtual smartphone 230 and the portion of virtual objet 228 corresponding to the display of the tablet. The salesperson can activate the virtual demonstration (e.g., via input(s) at device 250) to show the user how the user's phone and the tablet operate together to provide the e-mail application.

In the illustrated embodiment, the user next provides input 210d corresponding to a request to cease display of the CGR environment. In FIG. 2Q, the user selects user interface object 234 (e.g., a "close" affordance). In response to receiving the request to cease display of CGR environment 220, in the illustrated embodiment, device 200 returns to user interface 204f as shown in FIG. 2R. Compared to FIG. 2J, user interface 204f in FIG. 2R includes product information for the product represented by virtual object 228 added during display of CGR environment 220. Image 236 representing the tablet and keyboard combination illustrated in, e.g., FIG. 2O is displayed along with image 206 of the previously added laptop. In some embodiments, a user can swipe from left to right to center image 206 of the laptop on the display (e.g., device 200 scrolls the displayed products and centers the laptop on the display in response to receiving a left-to-right swipe gesture on touch-sensitive display 202). In some embodiments, user interface 252d displayed at device 250 is updated (e.g., by moving focus indicator 260) to indicate which product is centered on display 202.

In FIG. 2R, user interface 204f includes affordance 240 labeled "PURCHASE." Affordance 240 can be labeled "Checkout Now", "Pay", or the like. In some embodiments, affordance 240 is included previously on user interface 204f (e.g., FIGS. 2H-2J) and/or on user interface 204d, 204e, 204g, and/or 204h. In some embodiments, device 250 displays an affordance analogous to affordance 240 on, for example, user interface 252a, 252b, 252c, and/or 252d.

Device 200 detects user input 210e (e.g., a tap) on affordance 240. In response to detecting user input 210e, device 200 displays user interface 204i illustrated in FIG. 2S. In some embodiments, the salesperson can initiate display of user interface 204i on device 200 (e.g., via input(s) at device 250).

User interface 204i includes purchase information, such as product information 236 of the product(s) being purchased, price information 242a (e.g., product price, shipping costs, taxes, total cost, etc.), shipping information 242b, billing information 242c, and payment information 242d. The purchase information can relate to one or more products (e.g., products involved in the communication session (laptop, tablet, and/or keyboard) and/or other products included in a virtual shopping cart associated with device 200). In some embodiments, user interface 204i includes one or more affordances and/or menus that allow a user to edit the purchase information (e.g., change the shipping address or payment method). In some embodiments, the salesperson can change purchase information (e.g., via input(s) at device 250).

In some embodiments, device 200 displays financing information. Financing information can be displayed, for example, in response to user input at device 200 or upon initiation by the salesperson (e.g., via input(s) at device 250). Financing information can include, for example, payment terms such as monthly payment amount, duration (e.g., 12 months, 24 months, etc.), interest rate, down payment, total financing amount, fees, trade-in options (e.g., an option to trade in a currently-owned device for credit), etc.

In FIG. 2S, user interface 204i includes affordance 244 that can be selected to complete the transaction. In some embodiments, selection of affordance 244 (e.g., by the user) is required to complete the transaction. In some embodiments, the transaction can be completed by the salesperson (e.g., via input(s) at device 250 upon verbal confirmation from the user of device 200 through the communication session).

It should be recognized that the embodiments discussed above with respect to FIGS. 2A-2S are exemplary and are not intended to be limiting. For example, the techniques described above can be used for a product support specialist to provide troubleshooting advice to an owner of a product.

Figure 3:
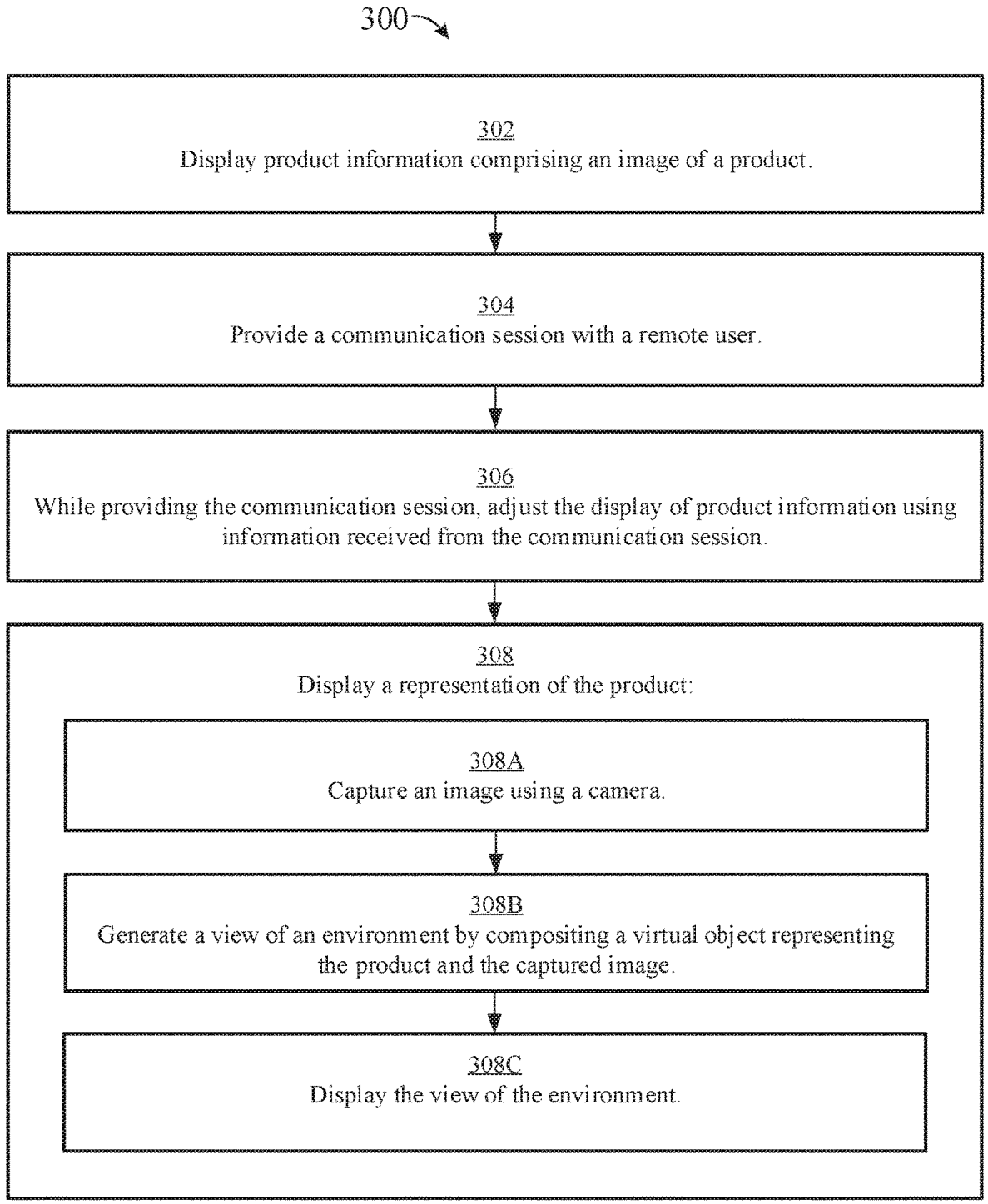
FIG. 3 depicts a flow chart of an exemplary process for a guided consumer experience, according to various embodiments.

Turning now to FIG. 3, a flow chart is depicted of exemplary process 300 for providing a guided consumer experience including a CGR environment. Process 300 can be performed using a user device (e.g., 100a, 100c, or 200). Although the blocks of process 300 are depicted in a particular order in FIG. 3, these blocks can be performed in other orders. Further, one or more blocks of process 300 can be optional and/or additional blocks can be performed.

At block 302, the device displays product information comprising an image of a product. In some embodiments, the product information is displayed in response to receiving a user input at the device. In some embodiments, the image of the product includes a virtual object, such as a virtual three-dimensional (3D) representation of the product (e.g., an interactive virtual 3D model of the product).

At block 304, the device provides a communication session with a salesperson of the product. In some embodiments, the product information comprising the image of the product is displayed using information received from the communication session. In some embodiments, a remote participant causes the display of the product information (e.g., the salesperson provides input at a device remote from the user's device to add the product information and initiate user interface 204d).

In some embodiments, the communication session includes one-way video (e.g., incoming video of the salesperson to the device) and 2-way audio. In some embodiments, salesperson includes a customer support specialist, product specialist, etc., even if sales is through another channel (e.g., the application described with reference to FIGS. 2A-2S). In some embodiments, the device displays a live image of the salesperson or customer support specialist. In some embodiments, the device displays an avatar of the salesperson. In some embodiments, the device displays a full-screen view of the salesperson (e.g., 204c) and switches to a new interface (e.g., 204d) when the product information is displayed. In some embodiments, the device moves the image of the salesperson to a window (e.g., 212) in a corner of the display. In some embodiments, when product information is displayed (e.g., initial product information or additional product information), the device adjusts the display to indicate that a product is being added (e.g., 204e). In some embodiments, the device displays an affordance to add more products (e.g., 214a).

At block 306, while providing the communication session, the device adjusts the display of product information using information received from the communication session (e.g., without user input at device 200). In some embodiments, adjusting the display of product information includes rotating, enlarging, highlighting, etc. product information or a representation of a product (e.g., the image or a virtual 3D model of a product). In some embodiments, adjusting the display of product information includes adding or removing product information. In some embodiments, adjusting the display of product information includes designating a product (e.g., FIG. 2J). In some embodiments, adjusting the display of product information includes displaying an animation.

In some embodiments, designating the product includes highlighting, outlining, centering, and/or enlarging a selected product. In some embodiments, designating a product includes changing the image of the product to an interactive virtual object. In some embodiments, the display of non-selected products is removed (e.g., all non-designated product information is removed).

In some embodiments, a remote participant (e.g., the salesperson or a customer support specialist) provides an input at a remote device that causes the display of product information to be adjusted. In some embodiments, the product information is adjusted to a predefined configuration (e.g., the user and/or salesperson can choose from a set of pre-defined views/configurations for a product). In some embodiments, the image of the product can be continuously adjusted (e.g., the displayed orientation and/or size of the image of the product is continuously adjustable). In some embodiments, the device adjusts the display of product information responsive to user input (e.g., the user can rotate, enlarge, etc. an image or virtual 3D model of a product with touch inputs on touch-sensitive display 202).

At block 308, the device displays a representation of the product in CGR. In some embodiments, the device displays the representation of the product in CGR by performing the operations described in blocks 708A, 708B, and/or 708C.

At block 308A, the device captures an image (or video) using a camera (e.g., 108). In some embodiments, the camera is included in or coupled to the device. In some embodiments, the image (or video) is captured by a remote camera and transmitted to the device or a remote server.

At block 308B, the device generates a CGR environment by compositing a (first) virtual object representing the (first) product and the captured image (or video). In some embodiments, compositing the virtual object and the captured image (or video) is based on a determined orientation of a device, a determined position of a device, or a determined pose of a device. In some embodiments, compositing the virtual object and the captured image (or video) is based on an identified surface in the captured image (or video) (e.g., the surface of table 224 is identified so that virtual objet 230 representing a phone can be displayed such that it appears to lie flat on table 224 next to the combined tablet and keyboard in CGR environment 220). In some embodiments, compositing the virtual object and the captured image (or video) is based on an identified feature point in the captured image (or video). In some embodiments, compositing the virtual object and the captured image (or video) includes placing the virtual object in a predefined or fixed configuration in the CGR environment (e.g., the user cannot move or re-arrange virtual objects in the CGR environment). In some embodiments, generating the CGR environment includes compositing: the virtual object (e.g., 222), a virtual product demonstration (e.g. 232), and the captured image (or video). In some embodiments, a remote participant of the communication session (e.g., the salesperson) initiates the product demonstration.

In some embodiments, a remote server performs some or all of the operations described in block 308B. For example, the remote server (1) obtains the captured image (from the device or a remote camera) and data indicating the product (from the device or a remote database), (2) generates a CGR environment by compositing the virtual object representing the product and the captured image, and (3) sends data representing the generated CGR environment to the device (e.g., via the communication session).

At block 308C, the device displays the generated CGR environment (e.g., 220). In some embodiments, the virtual object is displayed to scale in the CGR environment, relative to physical elements in the captured image (or video). In some embodiments, a representation (e.g., 216) of a selected or in-focus product is the only product represented in the CGR environment (e.g., even if the displayed product information includes information corresponding to more than one product (e.g., 206 and 216)). In some embodiments, displaying the generated CGR environment includes an animation (e.g., animate the transition from user interface 204g to user interface 204h by, for example, rotating and/or changing the size of image 216 into virtual object 222). In some embodiments, virtual objects are added the CGR environment using information from the communication session (e.g., by the salesperson) or in response to user input received by the device. In some embodiments, displaying the generated CGR environment includes replacing an existing user interface (e.g., 204f or 204g) with a user interface that includes the generated CGR environment (e.g., 204h). In some embodiments, block 308A, 308B, and/or 308C is performed in response to a user input (e.g., 210c). In some embodiments, displaying the generated CGR environment includes removing an image (e.g., live or avatar) representing the salesperson (e.g., 212).

In some embodiments, a virtual product demonstration is displayed outside of the CGR environment (e.g., in user interface 204f or 204g). In some embodiments, a virtual product demonstration is displayed on an image (or video) of a physical device (e.g., a virtual demonstration of a software product is superimposed on a physical display of a physical element in the captured image (or video), such as the display of a physical laptop computer in the captured image).

In some embodiments, the device adjusts the display of the generated CGR environment, by: generating an updated CGR environment by compositing a second virtual object representing a second product (e.g., virtual object 230 of a phone or virtual product demonstration 232) and the captured image (or video); and displaying the generated updated CGR environment. In some embodiments, the second virtual object includes a representation of the first product (e.g., the tablet in FIG. 2O) and the second product (e.g., the keyboard in FIG. 2O). In some embodiments, adjusting the display of the generated CGR environment includes animating entry of the second virtual object into the CGR environment. In some embodiments, adjusting the display of the generated CGR environment includes moving the first virtual object. In some embodiments, the device adjusts the display of the generated CGR environment in response to user input received by the device (e.g., a touch input on touch-sensitive display 202).

Executable instructions for performing the features of process 300 described above are, optionally, included in a transitory or non-transitory computer-readable storage medium (e.g., memory(ies) 106) or other computer program product configured for execution by one or more processors (e.g., processor(s) 102).

Aspects of the techniques described above contemplate the possibility of gathering and using personal information to provide a guided consumer experience. Such information should be collected with the user's informed consent.

Entities handling such personal information will comply with well-established privacy practices and/or privacy policies (e.g., that are certified by a third-party) that are (1) generally recognized as meeting or exceeding industry or governmental requirements, (2) user-accessible, (3) updated as needed, and (4) compliant with applicable laws. Entities handling such personal information will use the information for reasonable and legitimate uses, without sharing or selling outside of those legitimate uses.

However, users may selectively restrict access/use of personal information. For example, users can opt into or out of collection of their personal information. In addition, although aspects of the techniques described above contemplate use of personal information, aspects of the techniques can be implemented without requiring or using personal information. For example, if location information, usernames, and/or addresses are gathered, they can be generalized and/or masked so that they do not uniquely identify an individual.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
   one or more processors; and
   memory storying one or more programs configured to be executed by the one or more processors, the one or more programs including instructions for:
   displaying product information comprising an image of a first product;
   providing a communication session with a remote user; and
   while providing the communication session with the remote user:
      adjusting the display of product information using information received from the communication session with the remote user, wherein adjusting the display of product information includes displaying an image of a second product in addition to the image of the first product;
      activating a computer-generated reality mode for displaying a virtual object of the second product in a computer-generated reality environment, wherein activating the computer-generated reality mode includes:

ceasing display of the product information comprising the image of the first product and the image of the second product;
capturing an image using a camera;
generating a view of the computer-generated reality environment by compositing the virtual object of the second product and the captured image; and
displaying the view of the computer-generated reality environment;
while displaying the view of the computer-generated environment, receiving further information from the communication session with the remote user; and
in response to receiving the further information from the communication session with the remote user, updating the view of the computer-generated environment to include a demonstration of a software product at a location corresponding to the virtual object of the second product.

2. The electronic device of claim 1, the one or more programs further including instructions for:
displaying an avatar of the remote user.

3. The electronic device of claim 1, wherein the product information comprising the image of the first product is displayed using information received from the communication session with the remote user.

4. The electronic device of claim 1, the one or more programs further including instructions for:
while providing the communication session with the remote user, adjusting the display of product information responsive to input of a user of the electronic device.

5. The electronic device of claim 1, wherein compositing the virtual object and the captured image is based on a determined orientation of the electronic device, a determined position of the electronic device, or a determined pose of the electronic device.

6. The electronic device of claim 1, wherein compositing the virtual object and the captured image is based on an identified surface in the captured image.

7. The electronic device of claim 1, wherein compositing the virtual object and the captured image is based on an identified feature point in the captured image.

8. The electronic device of claim 1, wherein updating the view of the computer-generated environment to include the demonstration of the software product includes:
capturing a second image using the camera;
generating the updated view of the computer-generated reality environment by compositing the virtual object of the second product, the demonstration of the software product, and the second captured image; and
displaying the generated updated view of the computer-generated reality environment.

9. The electronic device of claim 1, wherein generating the view of the computer-generated reality environment includes compositing the virtual object, a virtual product demonstration, and the captured image.

10. The electronic device of claim 1, the one or more programs further including instructions for:
while providing the communication session with the remote user, detecting an input corresponding to a selection of the image of the second product,
wherein activating a computer-generated reality mode for displaying a virtual object of the second product in a computer-generated reality environment includes:
in response to detecting the input, activating the computer-generated reality mode.

11. A non-transitory computer-readable storage medium storing one or more programs configured to be executed by one or more processors of an electronic device, the one or more programs including instructions for:
displaying product information comprising an image of a first product;
providing a communication session with a remote user; and
while providing the communication session with the remote user:
adjusting the display of product information using information received from the communication session with the remote user, wherein adjusting the display of product information includes displaying an image of a second product in addition to the image of the first product;
activating a computer-generated reality mode for displaying a virtual object of the second product in a computer-generated reality environment, wherein activating the computer-generated reality mode includes:
ceasing display of the product information comprising the image of the first product and the image of the second product;
capturing an image using a camera;
generating a view of the computer-generated reality environment by compositing the virtual object of the second product and the captured image; and
displaying the view of the computer-generated reality environment;
while displaying the view of the computer-generated environment, receiving further information from the communication session with the remote user, and
in response to receiving the further information from the communication session with the remote user, updating the view of the computer-generated environment to include a demonstration of a software product at a location corresponding to the virtual object of the second product.

12. The non-transitory computer-readable storage medium of claim 11, the one or more programs further including instructions for:
displaying an avatar of the remote user.

13. The non-transitory computer-readable storage medium of claim 11, wherein the product information comprising the image of the first product is displayed using information received from the communication session with the remote user.

14. The non-transitory computer-readable storage medium of claim 11, the one or more programs further including instructions for:
while providing the communication session with the remote user, adjusting the display of product information responsive to input of a user of the electronic device.

15. The non-transitory computer-readable storage medium of claim 11, wherein compositing the virtual object and the captured image is based on a determined orientation of the electronic device, a determined position of the electronic device, or a determined pose of the electronic device.

16. The non-transitory computer-readable storage medium of claim 11, wherein compositing the virtual object and the captured image is based on an identified surface in the captured image or an identified feature point in the captured image.

17. The non-transitory computer-readable storage medium of claim 11, wherein updating the view of the computer-generated environment to include the demonstration of the software product includes:
  capturing a second image using the camera;
  generating the updated view of the computer-generated reality environment by compositing the virtual object of the second product, the demonstration of the software product, and the second captured image; and
  displaying the generated updated view of the computer-generated reality environment.

18. The non-transitory computer-readable storage medium of claim 11, wherein generating the view of the computer-generated reality environment includes compositing the virtual object, a virtual product demonstration, and the captured image.

19. The non-transitory computer-readable storage medium of claim 11, the one or more programs further including instructions for:
  while providing the communication session with the remote user, detecting an input corresponding to a selection of the image of the second product,
  wherein activating a computer-generated reality mode for displaying a virtual object of the second product in a computer-generated reality environment includes:
    in response to detecting the input, activating the computer-generated reality mode.

20. A method, comprising:
  displaying product information comprising an image of a first product;
  providing a communication session with a remote user; and
  while providing the communication session with the remote user:
    adjusting the display of product information using information received from the communication session with the remote user, wherein adjusting the display of product information includes displaying an image of a second product in addition to the image of the first product;
    activating a computer-generated reality mode for displaying a virtual object of the second product in a computer-generated reality environment, wherein activating the computer-generated reality mode includes:
      ceasing display of the product information comprising the image of the first product and the image of the second product;
      capturing an image using a camera;
      generating a view of the computer-generated reality environment by compositing the virtual object of the second product and the captured image; and
      displaying the view of the computer-generated reality environment;
    while displaying the view of the computer-generated environment, receiving further information from the communication session with the remote user; and
    in response to receiving the further information from the communication session with the remote user, updating the view of the computer-generated environment to include a demonstration of a software product at a location corresponding to the virtual object of the second product.

21. The method of claim 20, further comprising:
  displaying an avatar of the remote user.

22. The method of claim 20, wherein the product information comprising the image of the first product is displayed using information received from the communication session with the remote user.

23. The method of claim 20, further comprising:
  while providing the communication session with the remote user, adjusting the display of product information responsive to input of a user.

24. The method of claim 20, wherein compositing the virtual object and the captured image is based on a determined orientation of an electronic device, a determined position of the electronic device, or a determined pose of the electronic device.

25. The method of claim 20, wherein compositing the virtual object and the captured image is based on an identified surface in the captured image or an identified feature point in the captured image.

26. The method of claim 20, wherein updating the view of the computer-generated environment to include the demonstration of the software product includes:
  capturing a second image using the camera;
  generating the updated view of the computer-generated reality environment by compositing the virtual object of the second product, the demonstration of the software product, and the second captured image; and
  displaying the generated updated view of the computer-generated reality environment.

27. The method of claim 10, wherein generating the view of the computer-generated reality environment includes compositing the virtual object, a virtual product demonstration, and the captured image.

28. The method of claim 20, further comprising:
  while providing the communication session with the remote user, detecting an input corresponding to a selection of the image of the second product,
  wherein activating a computer-generated reality mode for displaying a virtual object of the second product in a computer-generated reality environment includes:
    in response to detecting the input, activating the computer-generated reality mode.

* * * * *

UNITED STATES PATENT AND TRADEMARK OFFICE
CERTIFICATE OF CORRECTION

PATENT NO. : 11,816,800 B2
APPLICATION NO. : 16/904995
DATED : November 14, 2023
INVENTOR(S) : Alexander B. Oser et al.

It is certified that error appears in the above-identified patent and that said Letters Patent is hereby corrected as shown below:

In the Claims
In Column 18, Line 35, in Claim 11, delete "user," and insert -- user; --.
In Column 20, Line 41, in Claim 27, delete "claim 10," and insert -- claim 20, --.

Signed and Sealed this
Thirteenth Day of February, 2024

Katherine Kelly Vidal
*Director of the United States Patent and Trademark Office*